United States Patent [19]
Sato et al.

[11] Patent Number: 5,588,096
[45] Date of Patent: Dec. 24, 1996

[54] OBJECT IMAGE DISPLAY DEVICES

[75] Inventors: Shinichiro Sato; Syunsuke Akaza, both of Fussa; Hiroyuki Yoshino, Higashiyamato, all of Japan

[73] Assignee: Casio Computer Co., Ltd., Tokyo, Japan

[21] Appl. No.: 665,060

[22] Filed: May 15, 1996

Related U.S. Application Data

[63] Continuation of Ser. No. 169,501, Dec. 16, 1993.

[30] Foreign Application Priority Data

Dec. 21, 1992 [JP] Japan .................................. 4-340298
Dec. 30, 1992 [JP] Japan .................................. 4-360896
Dec. 30, 1992 [JP] Japan .................................. 4-360900

[51] Int. Cl.$^6$ .................................................. G06F 15/00
[52] U.S. Cl. .................................................. 395/135
[58] Field of Search .............................. 395/135, 154, 395/155, 161; 345/113, 114

[56] References Cited

U.S. PATENT DOCUMENTS

| | | | |
|---|---|---|---|
| 4,305,131 | 12/1981 | Best | 364/521 |
| 4,333,152 | 6/1982 | Best | 364/521 |
| 4,445,187 | 4/1984 | Best | 364/521 |
| 4,569,026 | 2/1986 | Best | 364/521 |
| 4,884,972 | 12/1989 | Gasper | 434/185 |
| 4,913,539 | 4/1990 | Lewis | 352/87 |
| 5,111,409 | 5/1992 | Gasper et al. | 395/152 |
| 5,149,104 | 9/1992 | Edelstein | 273/434 |
| 5,404,426 | 4/1995 | Usami et al. | 395/120 |
| 5,544,305 | 8/1996 | Ohmaye et al. | 395/161 |

FOREIGN PATENT DOCUMENTS

| | | |
|---|---|---|
| 3-129572 | 6/1991 | Japan . |
| 2231246 | 11/1990 | United Kingdom . |
| 2260405 | 6/1992 | United Kingdom . |

OTHER PUBLICATIONS

Systems & Computers In Japan, vol. 19, No. 9, Sep., 1988, New York, pp. 1–9, Noguchi E.A., "A Method Of Generating Facial Expressions Using A Database–Driven Animation System".

"A Method Of Generating Facial Expressions Using A Database–Driven Animation System", Systems & Computers in Japan, vol. 19, No. 9, 1988, Silver Spring, MD, pp. 1–9.

*Primary Examiner*—Phu K. Nguyen
*Attorney, Agent, or Firm*—Frishauf, Holtz, Goodman, Langer & Chick

[57] ABSTRACT

An object image display device which changes and displays the image of an object such as an animal or a building. A display displays an object image including a combination of patterns of the parts of the object. The pattern of at least part of the object image displayed on the display is successively changed to a different part pattern of the same at least part in response to the keying operation of keys. Thus, the display displays the object image such that the at least part of the object image successively moves. The user is able to set a shape to which the object image is changed and the timing of changing the object image. Each time the object image is changed, a voice corresponding to the aspect of change of the object image is output sequentially to the outside. Externally inputting a voice into the device changes at least a part of the object image displayed at present in accordance with the contents of the input voice.

7 Claims, 34 Drawing Sheets

FIG.3

BASIC PART PATTERN ROM — 22

| PART \ PART PATTERN NO. | | 01 | 02 | 03 | | 50 | |
|---|---|---|---|---|---|---|---|
| CONTOUR | 1 | | | | | | ~ 22a |
| HAIR STYLE | 2 | | | | | | ~ 22a |
| EYES | 3 | | | | | | ~ 22a |
| NOSE | 4 | | | | | | ~ 22a |
| MOUTH | 5 | | | | | | ~ 22a |
| | | | | | | | |

FIG.4

"MOUTH" PATTERN ROM — 23

| PART PATTERN NO. \ NO. | 1 | 2 | 3 | 4 | | 150 | |
|---|---|---|---|---|---|---|---|
| 01 | 👄 | 👄 | 👄 | 👄 | | 👄 | — 23a |
| 02 | ⊖ | ⊖ | ⊖ | ⊖ | | ⊖ | — 23a |
| 03 | ⌣ | ⌣ | ⌣ | ○ | | ⌣ | — 23a |
| 50 | (—) | ◇ | ⌣ | ◇ | | ◇ | — 23a |

FIG.5

PART PATTERN RAM

| PART \ NAME | A | B | C |
|---|---|---|---|
| CONTOUR | 01 | 03 | |
| HAIR STYLE | 03 | 02 | |
| EYES | 02 | 50 | |
| NOSE | 50 | 01 | |
| MOUTH | 01 | 03 | |

"MOUTH" PATTERN RAM

| ADDRESS \ NAME | A | B | C |
|---|---|---|---|
| 0 | 01 | 03 | |
| 1 | 02 | 15 | |
| 2 | 04 | 20 | |
| 3 | 03 | 17 | |
| 4 | 08 | 09 | |
| 5 | 10 | 30 | |
| 6 | 05 | 01 | |

"MOUTH" PATTERN ROM (30)

| PART PATTERN NO. \ NO.(PRON.) | 0 (MUTE) | 1 (a) | 2 (i) | 3 (u) | ... | 30 (DA) |
|---|---|---|---|---|---|---|
| 01 | ⌣ | ⌣ | ⌒ | ○ | | ◇ |
| 02 | ○ | ○ | ◡ | ⊙ | | ◇ |
| 03 | ⌣ | ◇ | ◡ | ⊙ | | ◇ |
| ... | | | | | | |
| 50 | (—) | (◇) | (⌣) | (◇) | | (◇) |

FIG.15

VOICE ROM (31)

| | (a) | (i) | (u) | ... | (DA) |
|---|---|---|---|---|---|
| SAMPLED DATA | ∿∿ | ∿∿ | ∿∿ | | ∿∿ |

FIG.16

24 RAM

| INDIVIDUAL'S DATA | MONTAGE DATA | | | | | VOICE DATA. "MOUTH" PATTERN DATA | | | | |
|---|---|---|---|---|---|---|---|---|---|---|
| | CONTOUR | HAIR STYLE | EYES | NOSE | MOUTH | | | | | |
| | 01 | 50 | 01 | 03 | 01 | a 👄 | i 👄 | da 👄 | ken | n |
| | { GP1 } | | | | | ou | θriː | θriː | | |
| | 02 | 01 | 03 | 50 | 03 | o | o | ba | ku | ta |
| | { GP2 } | | | | | ou | fɔə | tuː | faiv | faiv |

NAME : AIDA KEN
PRON. : aida ken
TEL : 03(3×××)××××
PRON.: ou θriː θriː ×××× ××××

NAME : OBA KUTARO
PRON. : kutaro oba
TEL : 0425(5×)××××
PRON.: ou fɔə tuː faiv faiv × ××××

FIG.17

"MOUTH" PART PATTERN-TIME RAM 33

| ADDRESS | "MOUTH" PART PATTERN NO. | OUTPUT TIME (SEC.) |
|---|---|---|
| 1 | 1 | 3 |
| 2 | 2 | 2 |
| 3 | 30 | 3 |
| 4 | 2 | 1 |
| 5 | 10 | 2 |
| 6 | 3 | 3 |
| 7 | 6 | 5 |

FIG.21A DISPLAY 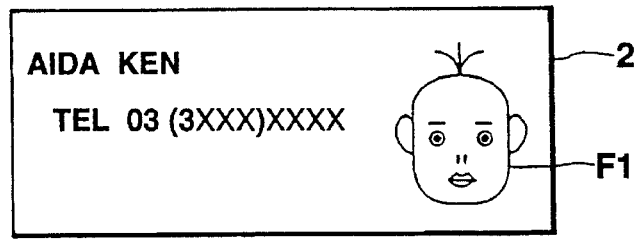
FIG.21B TALK KEY 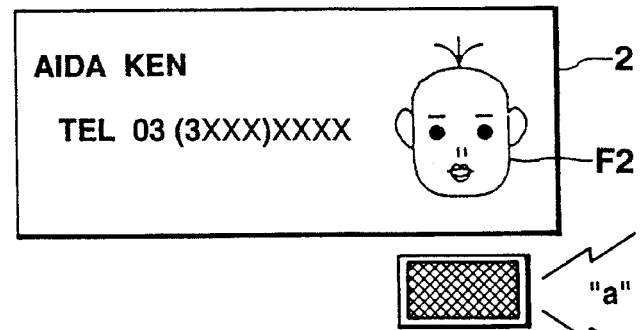
FIG.21C GIVEN TIME ELAPSED 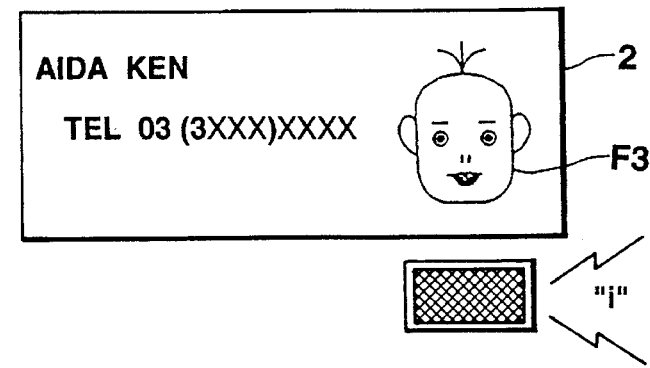
FIG.21D GIVEN TIME ELAPSED 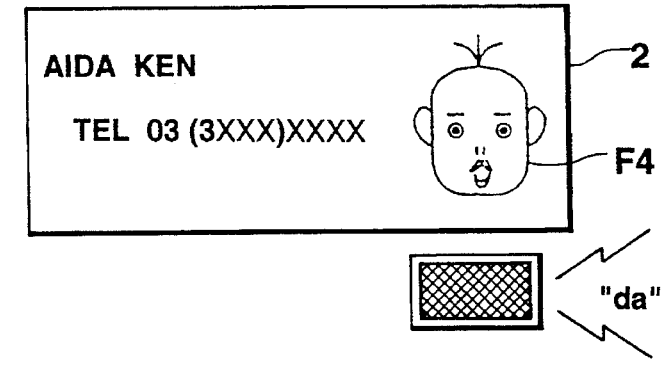

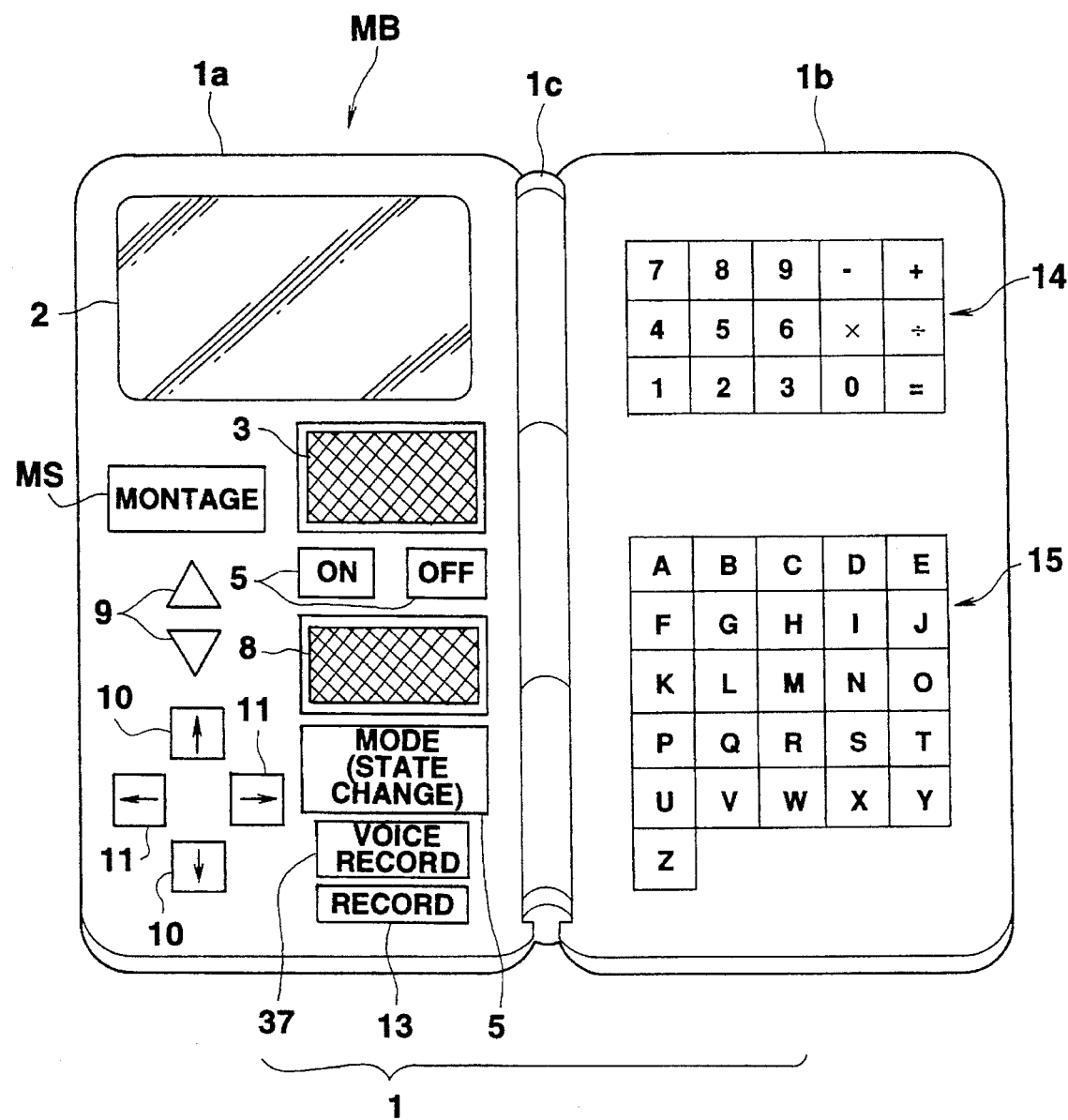

FIG.24

BASIC PART PATTERN ROM

22

| PART \ NO. | | 01 | 02 | 03 | | 49 | 50 |
|---|---|---|---|---|---|---|---|
| CONTOUR | 1 | | | | | | |
| HAIR STYLE | 2 | | | | | | |
| EYES | 3 | | | | | | |
| NOSE | 4 | | | | | | |
| MOUTH | 5 | | | | | | |

FIG.27

42 VOICE RAM

| VOICE | NO. |
|---|---|
| ROAR! | 1 |
| LAUGH | 2 |
| CRY! | 3 |
| | |

1ST STATE ("ROAR") CHANGE PART PATTERN-VOICE ROM

| PART VOICE \ NO. | A-11 | A-12 | A-13 | A-21 | A-22 | A-23 | A-53 |
|---|---|---|---|---|---|---|---|
| HAIR STYLE | | | | | | | |
| EYES | | | | | | | |
| MOUTH | | | | | | | |
| VOICE | PERSON'S ROARING VOICE (1) | PERSON'S ROARING VOICE (2) | PERSON'S ROARING VOICE (3) | PERSON'S ROARING VOICE (1) | PERSON'S ROARING VOICE (2) | PERSON'S ROARING VOICE (3) | LION'S ROARING VOICE (3) |

2ND STATE ("LAUGH") CHANGE PART PATTERN-VOICE ROM

22B

| PART / VOICE \ NO. | B-11 | B-12 | B-13 | B-21 | B-22 | B-23 | ... | B-53 |
|---|---|---|---|---|---|---|---|---|
| HAIR STYLE | (hair) | (hair) | (hair) | (hair) | (hair) | (hair) | | (outline) |
| EYES | (⊙⊙) | (( (( | (( (( | (⊙ (⊙ | (⊙ (⊙ | '⊂ ⊂ | | ⊂ ⊂ |
| MOUTH | ) | D | D | > | ▷ | ⌣ | | ⌣ |
| VOICE | PERSON'S LAUGHING VOICE (1) | PERSON'S LAUGHING VOICE (2) | PERSON'S LAUGHING VOICE (3) | PERSON'S LAUGHING VOICE (1) | PERSON'S LAUGHING VOICE (2) | PERSON'S LAUGHING VOICE (3) | | LION'S LAUGHING VOICE (3) |

FIG.28A

1ST MONTAGE RAM — 25A

| STORED NO. \ VOICE NO. ETC. | VOICE | CON-TOUR | HAIR STYLE | EYES | NOSE | | BOTH LEGS | |
|---|---|---|---|---|---|---|---|---|
| 1 | 0 | 50 | 50 | 50 | 50 | | 50 | GP1 |
| 2 | 1 | 50 | 50 | 32 | 50 | | 02 | GP2 |
| 3 | 2 | 50 | 45 | 31 | 33 | | 04 | GP3 |
| 20 | 19 | 30 | 45 | 35 | 8 | | 5 | GP20 |

DISPLAY REGISTER

FIG. 28B

2ND MONTAGE RAM

| VOICE NO. ETC. / STORED NO. | VOICE | CON-TOUR | HAIR STYLE | EYES | NOSE | ... | BOTH LEGS | |
|---|---|---|---|---|---|---|---|---|
| DISPLAY REGISTER ||||||||
| 1 | 0 | 50 | 50 | 50 | 50 | | 50 | ← HP1 |
| 2 | 1 | — | A-53 | A-53 | — | | — | ← HP2 |
| 20 | 19 | — | B-53 | B-53 | — | | — | ← HP20 |

25B

FIG. 32A WHEN RECORDED
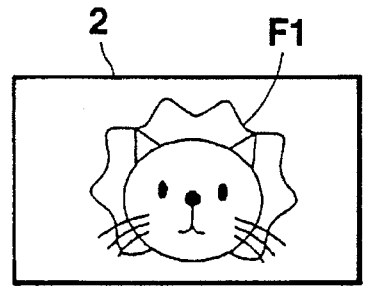
FIG. 32B [ROAR!]
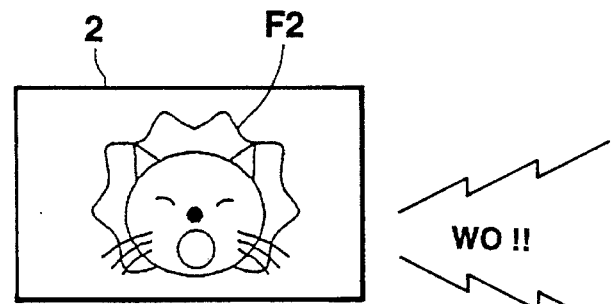
FIG. 32C [GET ANGRY!]
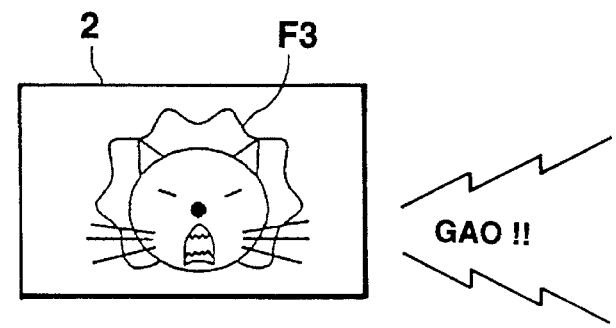
FIG. 32D [LAUGH!]
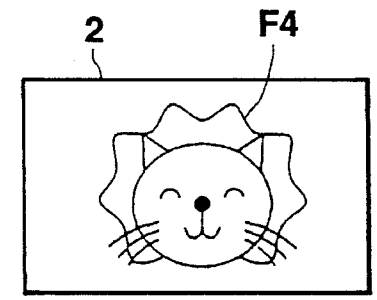

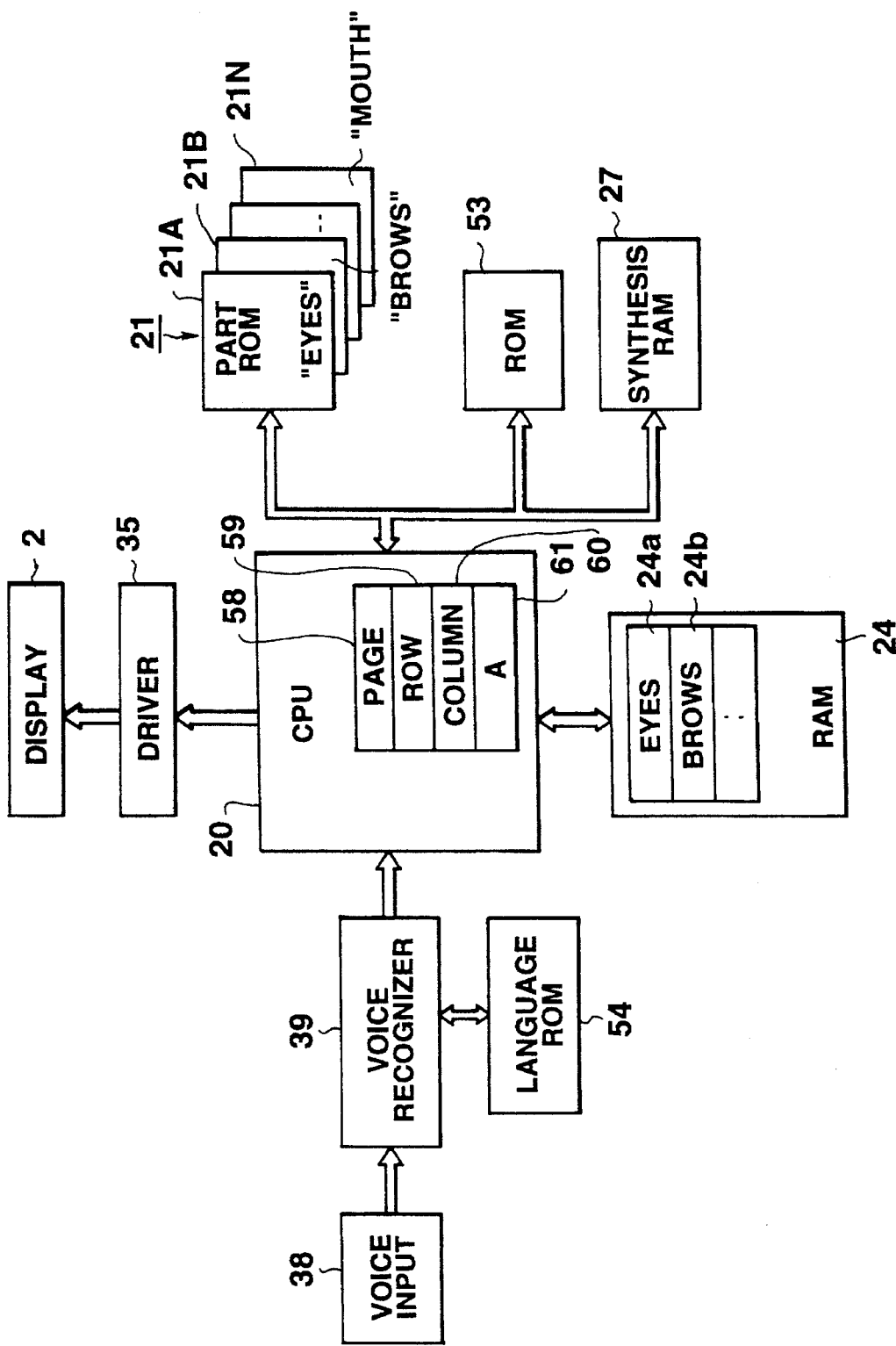

| SIZE NO. / KIND NO. | 1 | 2 | STANDARD SIZE 3 | 4 | 5 |
|---|---|---|---|---|---|
| 1 | ～ ～ | ～ ～ | ↑ ↑ | 👁 👁 | 👁 👁 |
| 2 | ⊙ ⊙ | ⊙ ⊙ | ⊙ ⊙ | ⊙ ⊙ | ⊙ ⊙ |
| : | | | | | |
| : | | | | | |

↑ 21A

OBJECT IMAGE DISPLAY DEVICES

This application is a Continuation of application Ser. No. 08/169,501, filed Dec. 16, 1993.

BACKGROUND OF THE INVENTION

The present invention relates to object image display devices which change and display an image of an object such as an animal or a building.

Object image display devices are known conventionally which display the image of a person's face which is created and recorded beforehand.

The object image display device selects by a key-in operation any particular one of beforehand stored patterns of each of parts of a person's face such as its "contour", "hair style", "eyes", "nose", "mouth" and "brows", and synthesizes and displays a face image from those selected patterns on a display.

In this conventional device, since the face created and displayed once is fixed always in shape and does not move, it is not interesting and cannot be changed automatically in shape. Thus, the conventional device cannot sufficiently satisfy the demand that the user wants to observe on the display a change in the face of the same person due to his joy and anger. To change a face created and displayed once, complicated key operations are required to recombine part patterns.

It is therefore an object of the present invention to provide an object image display device which is capable of automatically changing the image of an object such as the face and body shape of a person or a building without performing complicated key operations.

It is another object of the present invention to provide an object image display device which is capable of changing the image of an object in accordance with the feelings and humor of the user.

SUMMARY OF THE INVENTION

In order to achieve the above objects, the present invention provides an object image display device including:
  object image storage means for storing an object image which includes a combination of part patterns corresponding to the respective parts of an object;
  object image display means for displaying the object image stored in the object image storage means; and
  change means for successively changing a pattern of at least part of the object image displayed on the object image display means to a different part pattern to display the object image such that the at least part of the object image successively moves.

BRIEF DESCRIPTION OF THE DRAWINGS

FIG. 3 shows a stored state of part patterns in a basic part pattern ROM (Read Only Memory) section;

FIG. 4 shows a stored state of "mouth" patterns in a "mouth" pattern ROM section;

FIG. 5 shows a stored state of a part pattern RAM (Random Access Memory) section;

FIG. 6 shows a stored state of a "mouth" pattern RAM section;

FIG. 14 shows a stored state of "mouth" patterns in a "mouth" pattern ROM section;

FIG. 15 shows a stored state of a voice ROM section;

FIG. 16 shows a stored state of a RAM;

FIG. 17 shows a stored state of a "mouth" part pattern-time RAM section;

FIGS. 21A–D illustrate the respective display states of the display;

FIG. 22 shows the appearance of an object image display device as a third embodiment of the present invention;

FIG. 24 shows a stored state of part patterns in a basic part pattern ROM section;

FIG. 26 shows a stored state of part patterns and voice data in a second state change ROM section;

FIG. 27 shows a stored state of voice data and the corresponding voice number in a voice RAM;

FIGS. 27A, B show stored states of part pattern numbers and voice numbers in a first and a second montage RAM section, respectively;

FIGS. 32A–D illustrate the respective aspects of display on the display;

FIG. 33 is a block diagram of an electronic circuit of an object image display device as a fourth embodiment of the present invention;

DETAILED DESCRIPTION

Embodiments of the present invention will be described with respect to the accompanying drawings.

First Embodiment

A first embodiment of the present invention will be described below with respect to FIGS. 1–12C. First, an object image display device as the first embodiment will be described with respect to its structure.

Figure 1:
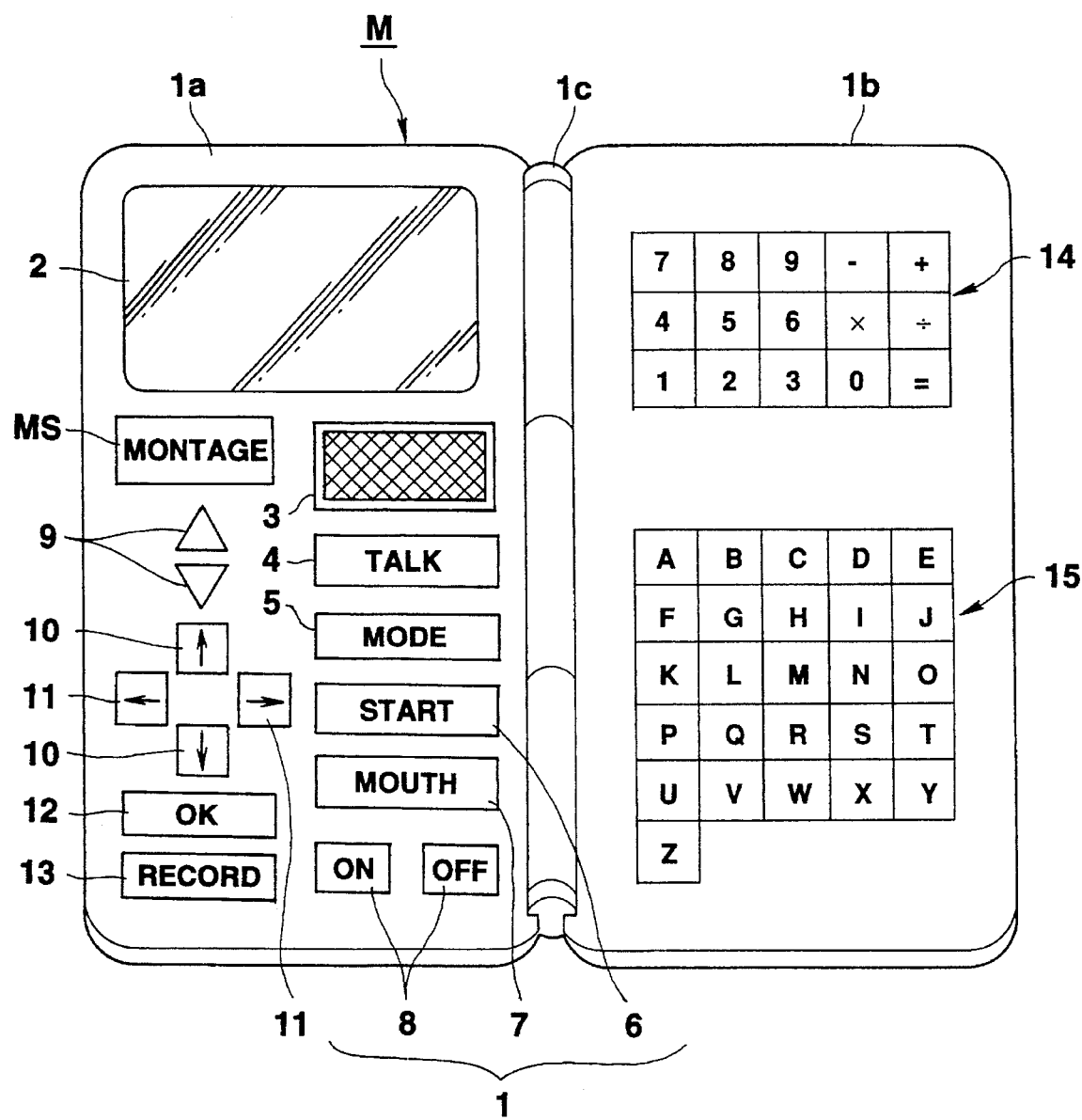
FIG. 1 shows the appearance of an object image display device as a first embodiment of the present invention.

FIG. 1 diagrammatically shows the appearance of the object image display device as the first embodiment. In FIG. 1, the object image display device M is composed of a display/operation panel 1a and a data input panel 1b which are connected closeably through a hinge 1C to each other.

The display/operation panel 1a is composed of a display 2 which is provided with a liquid crystal dot matrix display, a speaker 3, and various operation keys.

The main operation keys, disposed below the display 2, are a montage creation mode selection key MS operated to set a montage creation/display mode; a talk key 4 provided below the speaker 3 to operate so as to fulfil the talking function; a mode setting key 5 operated to set the respective modes; a start key 6 operated to start the montage creating operation; a moving "mouth" key 7 operated to move the mouth of a montage; an ON/OFF key 8 for a power supply; a record key 13 operated to record a created montage; a basic type selection key 9 operated to designate any one of various data items displayed on the display 2 and also functioning as a cursor moving key; a changed part selection key 10; a pattern change key 11, and an OK key 12 operated to record received data.

The data input panel 1b is provided with a ten key unit 14 operated to input numerical data to the device, and an alphabetical key unit 15 operated to input character data to the device.

A key-in unit 1 is composed of the montage mode selection key MS, talk key 4, start key 6, ten key unit 14, and alphabetical key unit 15.

The circuit configuration of the object image display device M as the first embodiment will be described with respect to FIG. 2. The device M includes a CPU (Central Processing Unit) 20, and ROM 21, RAM 24, key input unit 1, display 2 and synthesis RAM 27 connected to the CPU 20.

The CPU 20 sends/receives various data to/from the ROM 21, and RAM 24 and performs processes required for the various operations of the respective elements of the device M on the basis of keyed-in signals from the key-in unit 1 in accordance with various control programs stored in the ROM 21, and outputs various control signals to control the respective appropriate elements of the object image display device M on the basis of the result of performing the processes.

The ROM 21 is composed of a basic pattern ROM section 22 and a "mouth" pattern ROM section 23. The RAM 24 is composed of a part pattern RAM section 25 and a "mouth" pattern RAM section 26.

As shown in FIG. 3, the basic part pattern ROM section 22 of the ROM 21 stores a plurality of kinds of patterns of each of parts of a montage. The part patterns are classified into the parts "contour", "hair style", "eyes", "nose" and "mouth" and stored as bit map data at addresses (numbered) in part pattern storage areas 22a of the basic part pattern ROM section 22.

For example, a part pattern storage area 22a for "contour" is divided into 50 addresses Nos. "1"–"50" where an "contour" part pattern of a "rectangular face" is stored at address No. 01; an "contour" part pattern of a "somewhat angular face" is stored at address No. 02; and an "contour" part pattern of a "sharp jawed face" is stored at the last address No. 50.

Similarly, a part pattern storage area 22a for "hair style" is divided into 50 addresses Nos. "1"–"50" where a "hair style with erect hair" part pattern is stored at address No. "01"; a "hair style with parted-at-the-side hair" part pattern is stored at address No. "02"; and a "hair style with three grown hairs" part pattern is stored at the last address No. "50".

Similarly, a plurality of "eyes", a plurality of "nose" and a plurality of "mouth" part patterns are stored at addresses in the corresponding part pattern storage areas 22a.

While in the embodiment storage of the part patterns of each of human beings' faces as a motif in the part pattern storage area 22a has been described, the present invention is not limited to the particular case. Part patterns of each of the faces of animals and spacemen, and objects such as buildings may be stored.

As shown in FIG. 4, part patterns of "differently open mouths" numbered "1"–"150" corresponding to each of "mouth" part patterns Nos. "01"–"50" in the basic part pattern ROM section 22 are stored in the respective part pattern storage areas 23a of the "mouth" pattern ROM section 23.

For example, a storage area 23a for the part pattern No. "01" in the "mouth" pattern ROM section 23 is divided into locations "01"–"150". A part pattern "closed mouth" is stored at the storage location No. "1". A part pattern "slightly open mouth" is stored at the storage location No. "2". A part pattern "slightly horizontally extended open mouth" is stored at the storage location No. "3".

A storage area 23a for each of part patterns No. "02"–"50" is similarly divided into locations "1"–"150" which store corresponding part patterns "differently open mouths".

The RAM 24 stores individual' data such as the names and telephone numbers of the individuals keyed in by the key-in unit 1.

As shown in FIG. 5, numbers indicative of the patterns of the parts which compose each of the individuals' faces are stored for the respective parts at locations in the storage areas 25a of the part pattern RAM section 25 of the RAM 24.

For example, a part pattern number group GP1 indicative of the patterns of the parts of the face of a person "A" is stored at the corresponding column locations in the storage areas 25a. In this embodiment, the number group GP1 indicative of the part patterns of the face of the person "A" is composed of a "contour" part pattern No. "01", a "hair style" part pattern No. "03", an "eyes" part pattern No. "02", a "nose" part pattern No. "50", "mouth" part pattern No. "01", . . . , in the basic part pattern ROM 22.

A number group GP2 indicative of the part patterns of the face of a person B is composed of a "contour" part pattern No. "03", a "hair style" part pattern No. "02", an "eyes" part pattern No. "50", a "nose" part pattern No. "01", a "mouth" part pattern No. "03", . . .

Similarly, the number groups indicative of the part patterns of the respective faces of other persons are stored.

As shown in FIG. 6, numbers indicative of part patterns "mouth" used when a respective one of the montage images of the faces created on the basis of the number groups indicative of the part patterns of the part pattern RAM section 25 is changed with time are stored, in order, at corresponding address numbers in the "mouth" pattern RAM section 26.

For example, in the case of the "mouth" part pattern of the person "A", a "mouth" pattern number group KP1 is stored which is composed of "01", "02", "04", "03", "08", "10", "05", ... indicative of "mouth" part patterns arranged in the sequence of address numbers "0", "1", "2", ... in the "mouth" pattern RAM section 26.

Similarly, also in the case of the "mouth" part pattern of the person "B", a "mouth" pattern number group KP2 is stored which is composed of "03", "15", "20", "17", "09", "30", "01", ... arranged in the sequence of address numbers "0", "1", "2" . . .

Similarly, "mouth" pattern number groups for the respective other persons are stored.

Main processes performed by the object image display device M as the first embodiment will be described below with respect to the flowcharts of FIGS. 7–10.

First, a process for creation of a montage of FIG. 7 will be described. In this process, an image of a person's face is created on the basis of a combination of part patterns made by the user's switching operation.

It is first determined at step S100 whether the montage creation mode select switch MS is operated for inputting purposes. If not, a looping operation is performed to bring about a standby state. If it is determined at step S100 that the switch MS is operated, control passes to step S101, where a number designating a first basic type (for example, a part pattern No. "01" in the basic part pattern ROM section 22 in the case of FIG. 3) is set initially, and a number designating a part to be changed (for example, "1" if the part number indicates a "contour") is set initially in the RAM 24.

Control then passes to step S102, where a part pattern synthesis subroutine is executed in which part patterns corresponding to a part pattern No. "01" which designates the first basic type initially set at step S101 are read sequentially from the basic part pattern ROM section 25, and stored temporarily and combined in the synthesis RAM 27. Control then passes to step S103.

Figure 8:
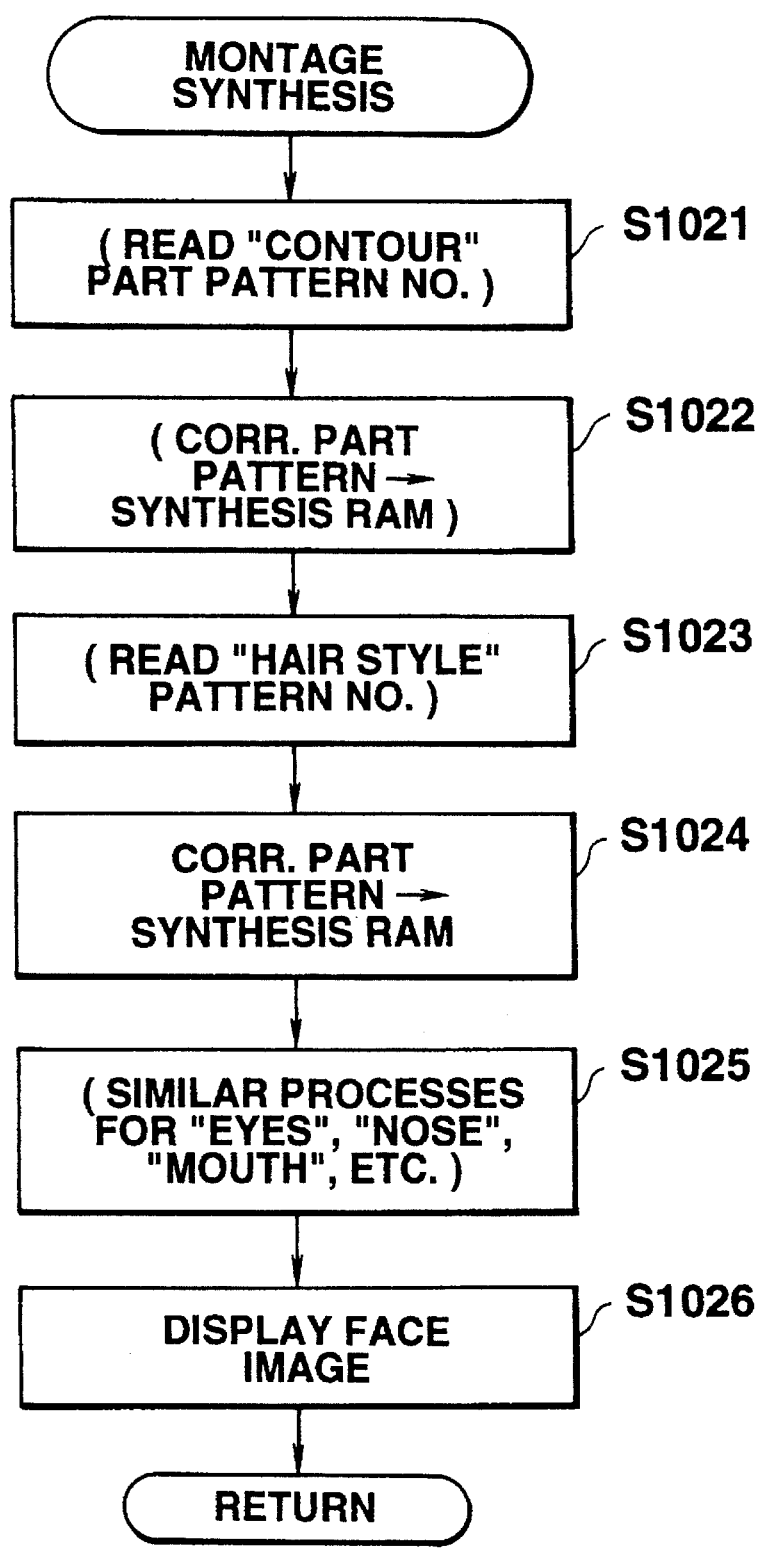
FIG. 8 is a flowchart indicative of a process for synthesizing a montage from part patterns.

Now, the part pattern synthesis will be described with respect to the flowchart of FIG. 8.

First, at step S1021 a part pattern number (in this example, "01") corresponding to the "contour" indicated by the part number "1" of the part pattern No. "01" set initially at step S101 is read. Control then passes to step S1022, where a "contour" part pattern indicated by the number "01" is read from the basic part pattern ROM section 22 and transferred to the synthesis RAM 27.

Control then passes to step S1023, where a part pattern number (in this example, "01") corresponding to "hair style" indicated by the next part number "2" is read. Control then passes to step S1024, where a part pattern corresponding to the part pattern number "01" is read from the basic part pastern ROM section 22 and transferred to the synthesis RAM 27. Control then passes to step S1025, where for the part patterns "eyes", "nose", "mouth" indicated by part pattern numbers "3", "4", "5", respectively, the part patterns corresponding to the respective part pattern numbers "01" are likewise read sequentially from the basic part pattern ROM section 22 and transferred to the synthesis RAM 27. Control then passes to step S1026. As a result, the respective part patterns corresponding to the pattern number "01" are read separately from the basic part pattern ROM section 22, transferred to and stored temporarily stored in the synthesis RAM 27.

At step S1026 one face image F1 is synthesized from the part patterns in the synthesis RAM 27 and displayed on the display 2 (FIG. 11) under control of the display driver 35.

Control then returns to step S103 of FIG. 7, where the pattern numbers indicative of the parts of the face image F1, and the names of the parts are displayed below the first face image F1 of the first basic type displayed on the display 2 at step 1026. In addition, all the part patterns designated generally by P in the basic part pattern ROM section 22 are displayed in a table (FIG. 11) next to the face F1.

Control then passes to step S104, where it is determined whether any one of the basic type select keys 9 on the display/operation panel la is operated for inputting purposes. If so, control passes to step S105 where the number designating the basic type is changed (in this example, No. "01" indicative of the first basic type is changed to No. "02" indicative of the second basic type). Control then returns to the step S102 directed to the synthesis of a face image from the part patterns.

Thus, each time any basic type select key 9 is operated, the basic type of the face displayed on the display 2 is changed to another, in the sequence of "01"→"02"→"03"→. . . Thus, the operator is able to select a desired face image of the basic type by the operation of a basic select key 9.

If not at step S104, control passes to step S106 where it is determined whether any one of the changed part select keys 10 is operated for inputting purposes. If so, control passes to S107, where the changed part number is changed from "1" for the "contour" set initially at present to "2" indicative of a "hair style" part number. Control then returns to step S102 directed to the part pattern synthesis. If not at step S106, control passes to step S108.

Thus, each time the changed part select key 10 is operated at step S106, the part of the face of the basic type displayed on the display 2 and to be changed is changed to another in the sequence of the "contour"→"hair style"→"eyes". . . Thus, the operator is able to select a desired part by the operation of a changed part select key 10.

Figure 11:
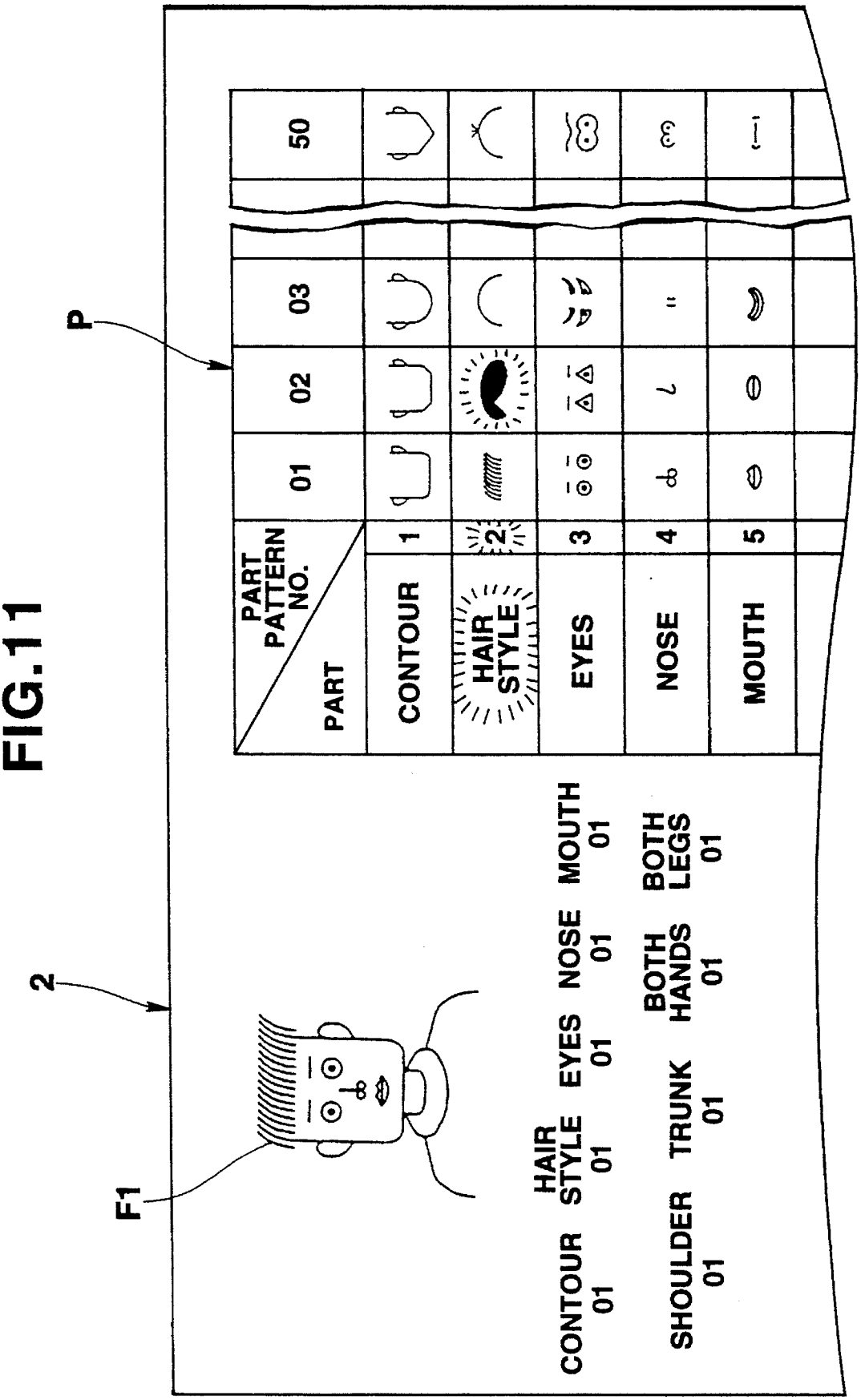
FIG. 11 illustrates the display state of a display.

In FIG. 11, the name of the part (in this case, "hair style") and its pattern number (in this example, "02" indicative of the "hair style") changed by the operation of a changed part select key 10 and of the numbers indicative of the part patterns of the face of the basic type displayed on the display 2 are displayed by a going-on-and-off radial such that the name of the part and its part pattern No. selected at present by the operation of the changed part select key 10 can be confirmed visually.

At step S108 it is determined whether any one of the pattern change keys 11 is operated for inputting purposes. If so, control passes to step S109 to change the part pattern number. For example, if a "hair style" part is designated at step S107, the part pattern number of "hair style" is changed from "01" to "02". Thereafter, control returns to the step S102 directed to the synthesis of a montage from the part patterns. If not at step S108, control passes to step S110.

Thus, each time a pattern change key 11 is operated at step S108, the part pattern displayed on the display 2 is changed to another. Thus, the operator is able to select a desired part pattern.

In FIG. 11, the part pattern (in this case, a "hair style" part pattern indicated by No. "02") indicated by the part pattern number changed by the operation of the pattern change key 11 and of the numbers indicative of the part patterns of the face of the basic type displayed on the display 2 is displayed in a going-on-and-off radial such that the part pattern selected at present by the operation of the pattern change key 11 can be confirmed visually.

At step S110 it is determined whether the record key 13 is operated for inputting purposes. If not, control returns to step S104, where the part pattern numbers are put in a changeable state. If so at step S110, control passes to step S111, where the part pattern number group HP1 corresponding to the face F2 changed by execution of steps S104–S109 is stored in the part pattern RAM section 25. The processing is then terminated.

By this montage creation process, a face which the operator intends to create is easily and rapidly created and recorded.

Figure 9:
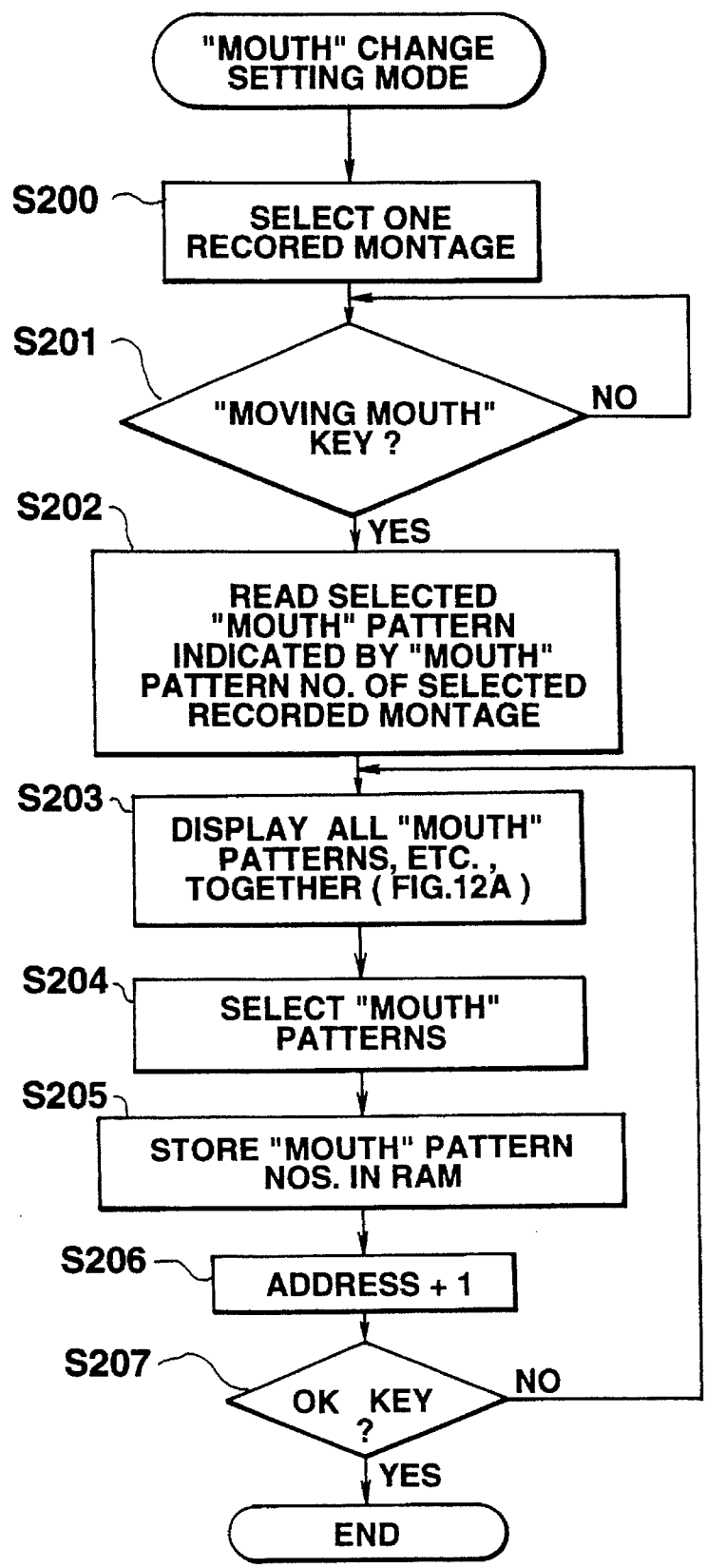
FIG. 9 is a flowchart indicative of a "mouth" change setting mode process.

A "mouth" change pattern setting mode process will be described with reference to a flowchart of FIG. 9. It is performed when a "mouth" change setting mode is set by the mode setting key 5 to set and record a "mouth" change pattern.

First, at step S200 one of the plurality of face montages recorded beforehand in the above creation process (for example, a "face" F2 montage) is selected by the operation of the OK key 12.

Control then passes to step S201, where it is determined whether the moving "mouth" key 7 is operated for inputting purposes. If not, a looping operation is performed until the moving "mouth" key 7 is operated so. If so at step S201, control passes to step S202, where a part pattern indicated by the "mouth" part pattern No. (in this case, "01") of the recorded montage F2 selected by the step S200 is read from the "mouth" pattern ROM section.

Figure 12A:
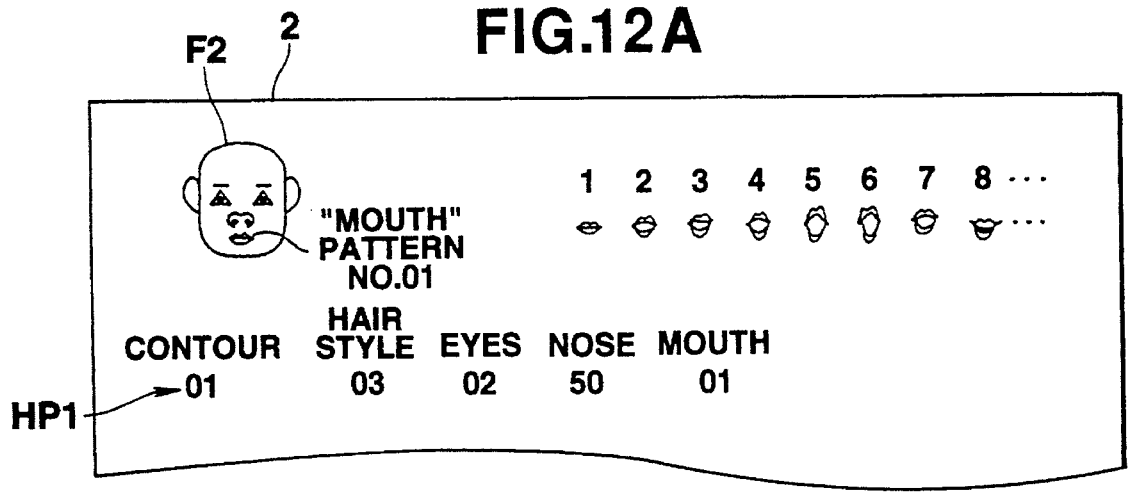
FIGS. 12A–C illustrates the respective display states of the display.

Control then passes to step S203, where all the "mouth" part patterns corresponding to the "mouth" part pattern of the selected face F2 are read from the "mouth" pattern ROM section 23 and are together displayed along with the corresponding part pattern numbers (FIG. 12A). Control then passes to step S204, where "mouth" patterns to be changed with time are selected by the pattern change key 11.

Control then passes to step S205, where the number indicative of the selected "mouth" part pattern is recorded in the "mouth" pattern RAM section 26. For example, in the case of the person "A", the number "01" indicative of the "mouth" part pattern is recorded at an address "0". Control then passes to step S206, where the address number in the "mouth" pattern RAM section 26 is incremented by one.

Control then passes to step S207, where it is determined whether the OK key 12 is operated for inputting purposes. If not, control returns to the step S203, where another "mouth" part pattern is again selected and a process for storing a number indicative of the part pattern is subsequently performed. If so at step S207, this process is terminated.

By this process, the "mouth" pattern which the operator desires to change in the selected face montage F2 is set freely. For example, in the case of the persons "A" and "B", corresponding part patterns indicated by the pattern numbers KP1 and KP1 of FIG. 6 are set freely.

Figure 10:
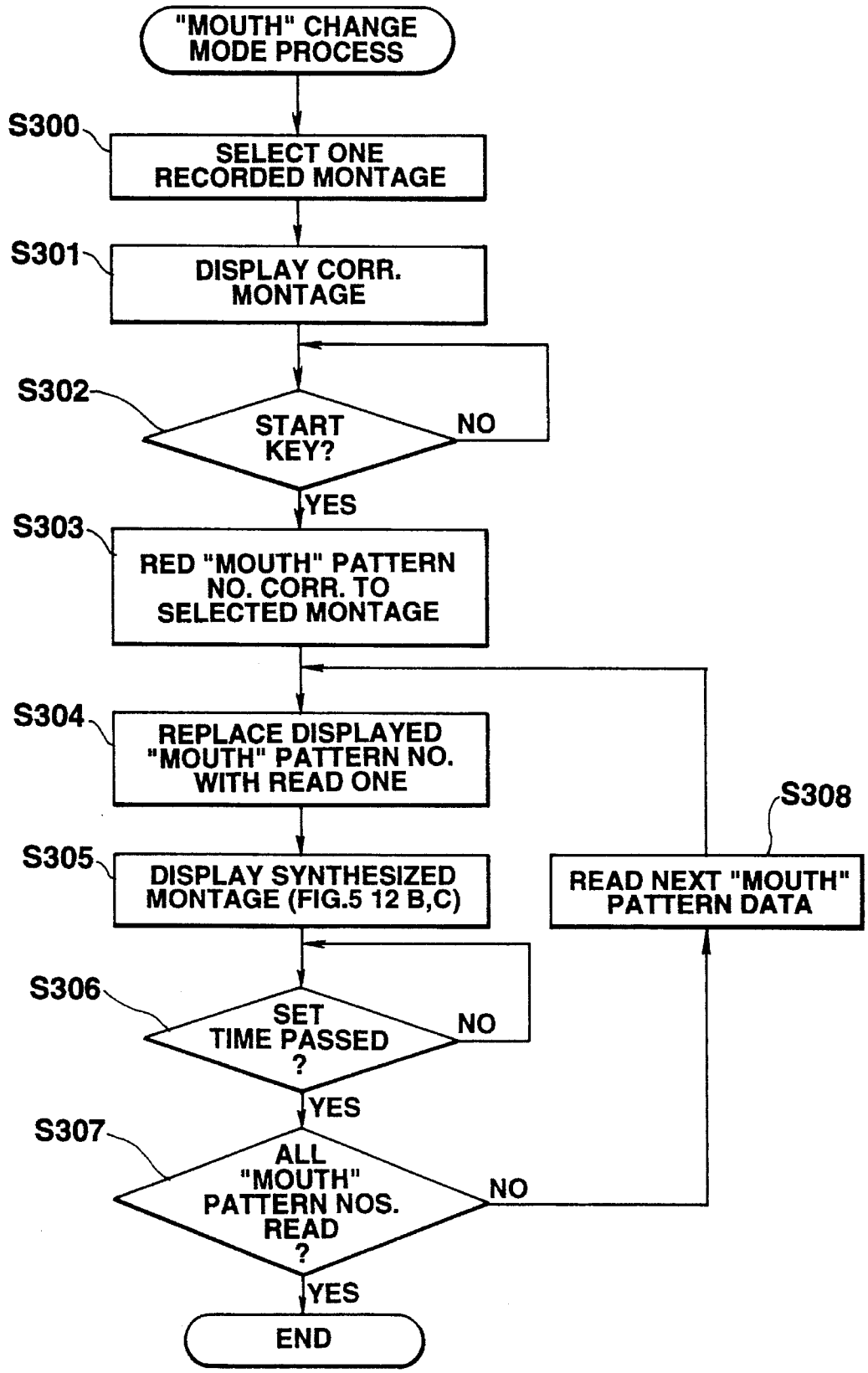
FIG. 10 is a flowchart indicative of a "mouth" change display mode process.

The "mouth" change mode process will be described with reference to a flowchart of FIG. 10. This process involves changing the opening of the "mouth" of the recorded face montage with time.

First, at step S300 one recorded montage (for example, a face F2 montage) is selected among many recorded face montages.

Control then passes to step S301, where part pattern number group HP1 corresponding to the respective part patterns of the face F2 selected at the step S300 is read from the part pattern RAM section 25, the corresponding part patterns are read from the basic part pattern ROM section 22 in accordance with the part pattern number group HP1, and a face F2 is synthesized from those read part patterns and displayed on the display 2 (FIG. 12A).

Control then passes to step S302, where it is determined whether the start key 6 is operated for inputting purposes. If not, a looping operation is performed until the start key 6 is operated.

If so at step S302, control passes to step S303, where a "mouth" part pattern number (in this example, in the case of the person "A", a "mouth" pattern number "02" corresponding to an address number "1" of the part number group KP1 of FIG. 6) for the face F2 montage selected at step S300 is read from the "mouth" pattern RAM section 26.

Figure 12B:
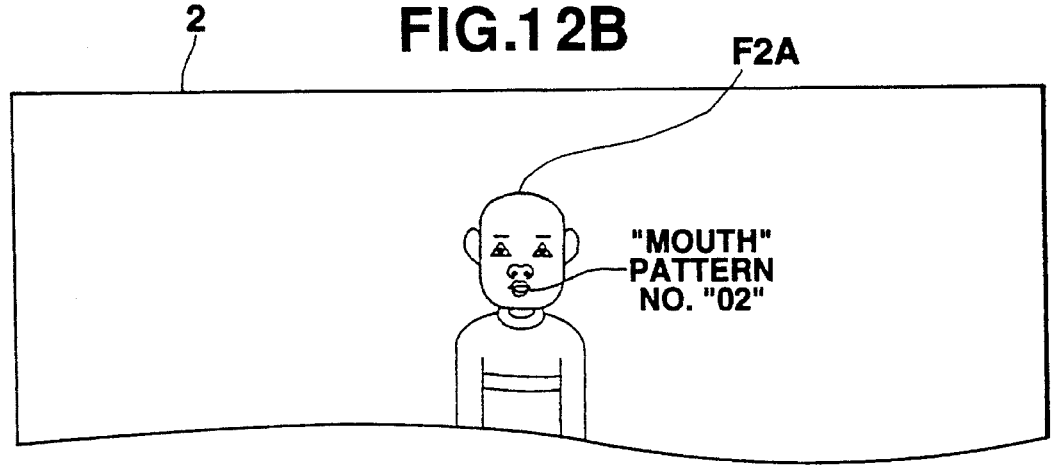

Control then passes to step S304, where the number "01" indicative of the displayed "mouth" part pattern is replaced with the "mouth" pattern number "02" read at step S303. Control then passes to step S305, where a montage of a face F2A synthesized from the "mouth" part pattern corresponding to the replacing part pattern number "02" and the respective other part patterns displayed at present is displayed on the display 2 (FIG. 12B).

Control then passes to step S306, where it is determined whether a predetermined time has elapsed. If not, control waits until the predetermined time has elapsed.

Figure 12C:
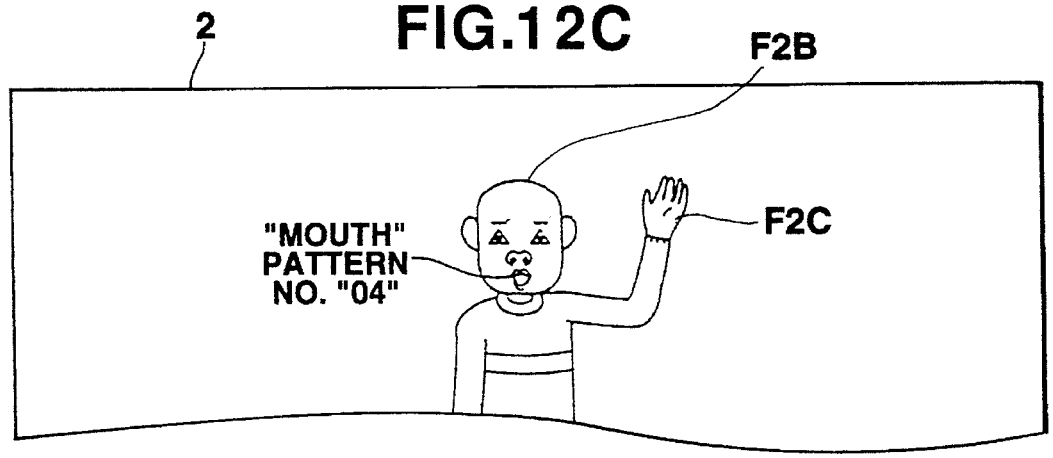

If so at step S306, control passes to step S307, where it is determined whether reading all the "mouth" pattern numbers has been completed or up to the last address number in the "mouth" pattern RAM section 26 have been encountered. If not, control passes to step S308, where a "mouth" part pattern "04" indicated by the next address number "2" is read. Control then returns to step S304, where the displayed "mouth" pattern number "02" is replaced with the "mouth" pattern number "04" read at step S303. Control then passes to step S305. A montage of a face F2B synthesized from the "mouth" part pattern indicated by the replacing "mouth" part pattern number "04" and the other part patterns displayed at present is displayed on the display 2 (FIG. 12C). Control then passes to step S306 to iterate the processes at steps S304–S308 until it is determined that all the "mouth" patterns are read at step S307.

If so at step S307, or reading up to the last address number in the "mouth" pattern RAM section 26 is completed, this process is terminated.

When one recorded face F2 selected from many recorded face montages is displayed on the display 2 and the start key 6 is then operated, only the "mouth" part of the face F2 is changed with time on the basis of the "mouth" part patterns stored in the "mouth" pattern RAM section 26, as shown in FIGS. 12A–C. Thus, the person montage is displayed as if he were talking.

While in the present embodiment only the "mouth" part of the face montage is illustrated as being changed, the present invention is not limited to this particular embodiment. For example, as shown in FIG. 12C, both the "mouth" and the "arm(s) and hand(s)" F2C of the person may be displayed so as to move. In that case, as in the present embodiment, an "arm(s) and hand(s)" pattern RAM section is required to be further provided in which kinds of "arm(s) and hand(s)" pattern numbers are recorded and the corresponding "arm(s) and hand(s)" part patterns are read and displayed sequentially.

Similarly, other parts ("brows", "eyes", "nose", etc.) of the face montage may be changed and displayed.

Second Embodiment

Figure 13:
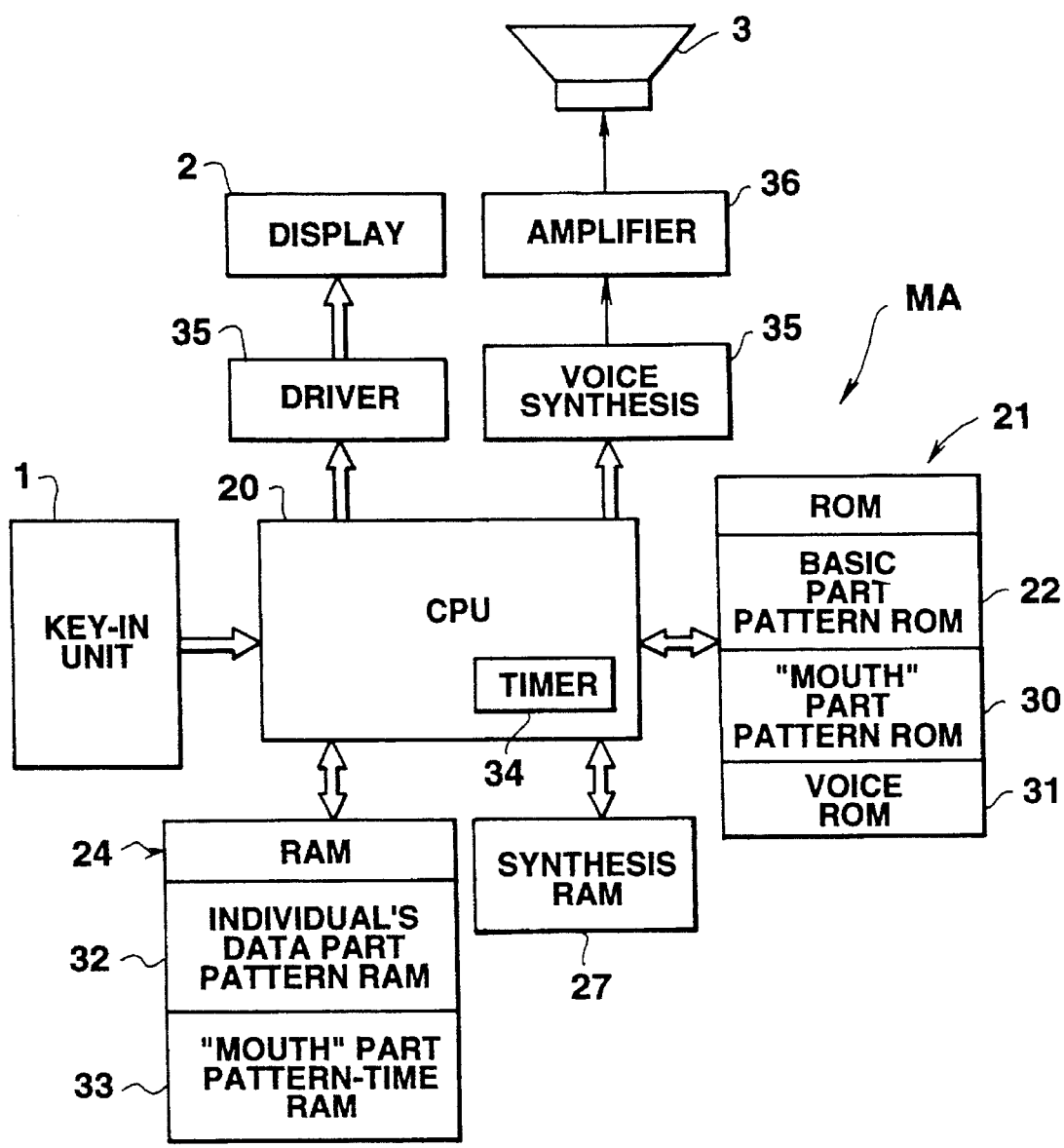
FIG. 13 is a block diagram of an electronic circuit of an object image display device as a second embodiment of the present invention.

A second embodiment of the present invention will be described next with reference to FIGS. 13–21D. FIG. 13 is a block diagram of an illustrative circuit configuration of the object image display device MA as the second embodiment. The same reference numeral is used to identify the same element in the second and first embodiments and further description thereof will be omitted.

The display device MA is provided with a CPU 20 which is connected to a ROM 21 (composed of a basic part pattern ROM section 22, a "mouth" pattern ROM section 30 and a voice ROM section 31), a RAM 24 (composed of an individual's data part pattern RAM section 32 and a "mouth" part pattern-time RAM section 33), a key-in unit 1, a voice synthesis unit 35, an amplifier 36, a display 2 and a synthesis RAM section 27. CPU 20 is provided therein with a timer 34 which measures an elapsed time.

As shown in FIG. 14, the "mouth" pattern ROM section 30 stores "muteness" and 30 kinds of differently open mouths and hence different forms of lips along with corresponding kanas (Japanese syllabaries) ("a", "i", "u", "e", "o"..., "n") for each of the part pattern numbers "01"–"50".

The "mouth" pattern ROM section 30 stores "mouth" part patterns indicative of the different degrees of opening of the "mouth" present when the respective sounds, "a", "i", "u", ... are uttered for each of the part patterns No. "01"–"50" in the basic part pattern ROM section 22.

As shown in FIG. 15, the voice ROM section 31 stores voices indicative of respective fifty sounds ( "a", "i", "u", "e", "o", ... "wa", "n") as sampled data. It also stores voiced sounds "da", "ga", and p-sounds "pa", "pi" etc., as sampled data items.

The respective kanas are numbered ("muteness" is numbered "0", "a" is numbered "1", "i" is numbered "2"...).

As shown in FIG. 16, the RAM 24 stores data on the name, telephone number and face montage of each of persons (part pattern numbers), "voice" data-"mouth" part patterns, etc.

In the present embodiment, the RAM 24 stores the name "Aida Ken", its pronunciation "aida ken", his telephone number "03 (300) ****", its pronunciation "óu θri: θri: óu óu ....", part pattern number group GP1 of the face of the "Aida Ken" (in the particular embodiment, No."01" as a "contour" part pattern, No. "50" as a "hair style" part pattern, No. "01" as an "eyes" part pattern, No. "03" as a "nose" part pattern, No. "01" as a "mouth" part pattern), "voice" data-"mouth" part pattern on the pronunciation of "Aida Ken", and voice data and "mouth" part pattern on the pronunciation of his telephone number.

In the present embodiment, the RAM 24 also stores the name "Oba Kutaro", its pronunciation "oba kutaro", his telephone number "0425 (53) ****", its pronunciation " óu fóð tú: fáiv ...", part pattern number group GP2 of the face of the "Oba Kutaro" (in the particular embodiment, No."02" as a "contour" part pattern, No. "01" as a "hair style" part pattern, No. "03" as an "eyes" part pattern, No. "50" as a "nose" part pattern, No. "03" as a "mouth" part pattern), "voice" and "mouth" part pattern data on the pronunciation of "Oba Kutaro", voice data and a "mouth" part pattern on the pronunciation of his telephone number. Similarly, the RAM 24 also stores individual's data on others.

As shown in FIG. 17, the "mouth" part pattern-time RAM section 33 stores a number indicative of any particular one of the fifty sounds in the "mouth" pattern ROM section 30 as a "mouth" pattern, and the voice output time duration are stored at corresponding designated address.

In the present embodiment, the RAM section 33 stores a "mouth" part pattern No. "1" (corresponding to the kana "a") and an output time duration "3 seconds" at address No. "1"; a "mouth" part pattern No. "2" (corresponding to a kana "i") and an output time duration "2 seconds" at address No. "2"; and a "mouth" part pattern No. "30" ( corresponding to a kana "da") and an output time duration "3 seconds" at address No. "3" and so on.

Figure 18:
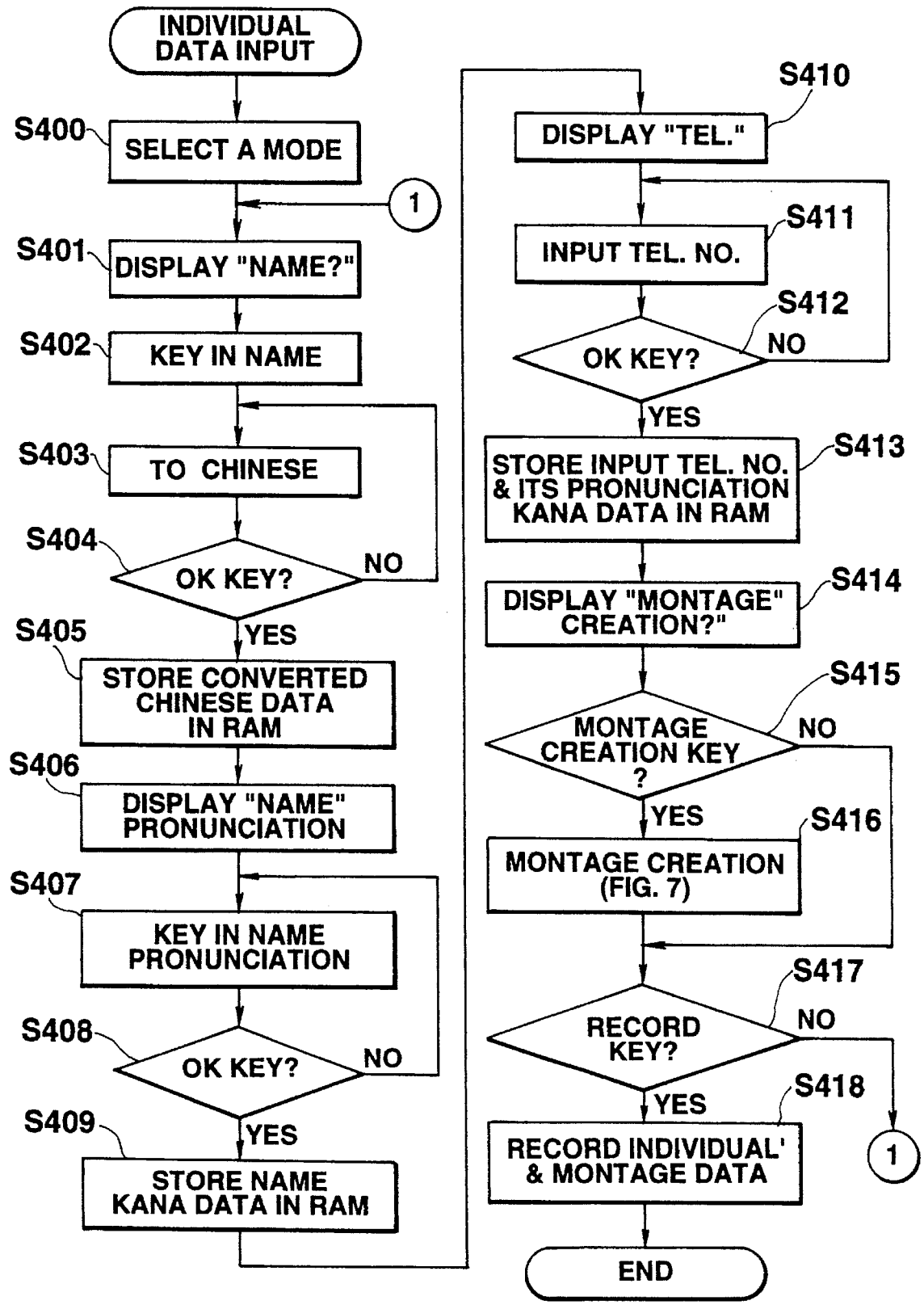
FIG. 18 is a flowchart indicative of an individuals' data inputting process.
Figure 19:
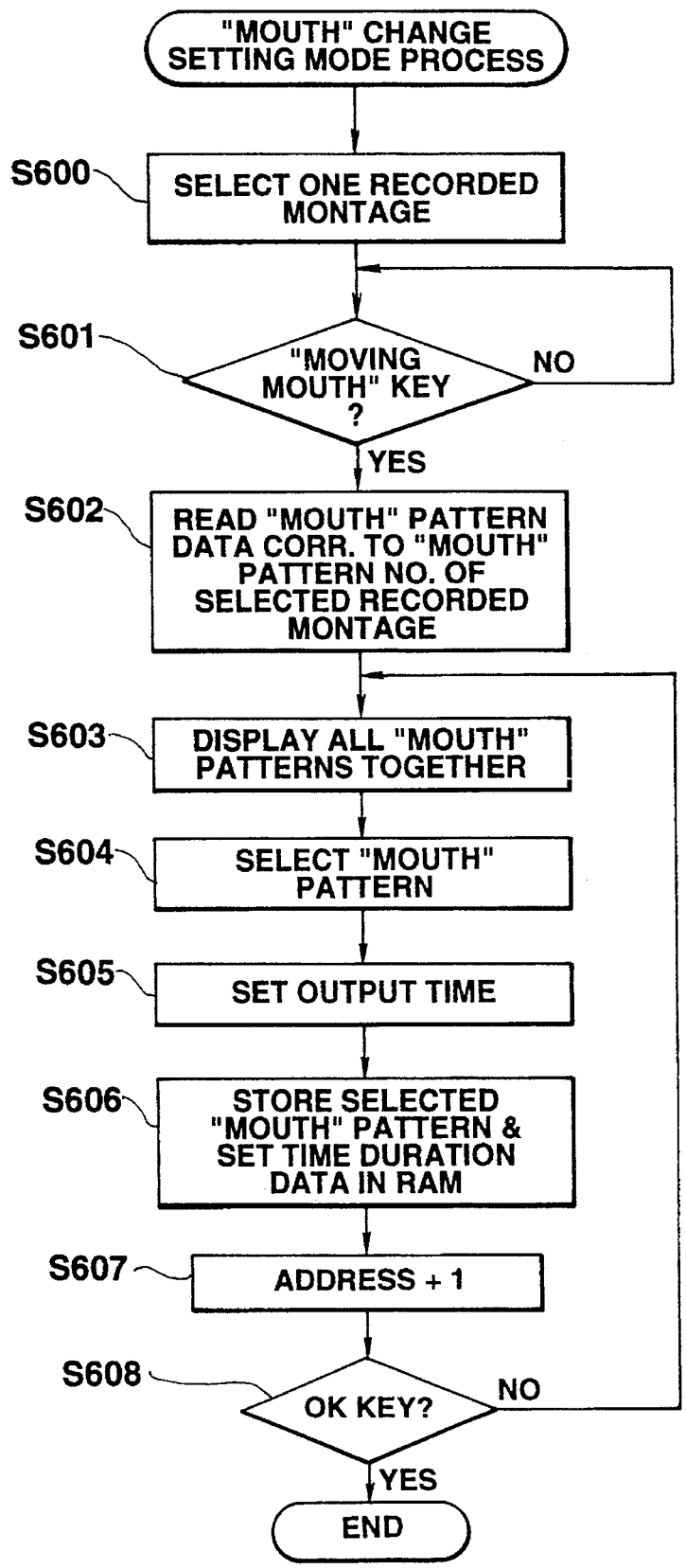
FIG. 19 is a flowchart indicative of a "mouth" change setting mode process.
Figure 20:
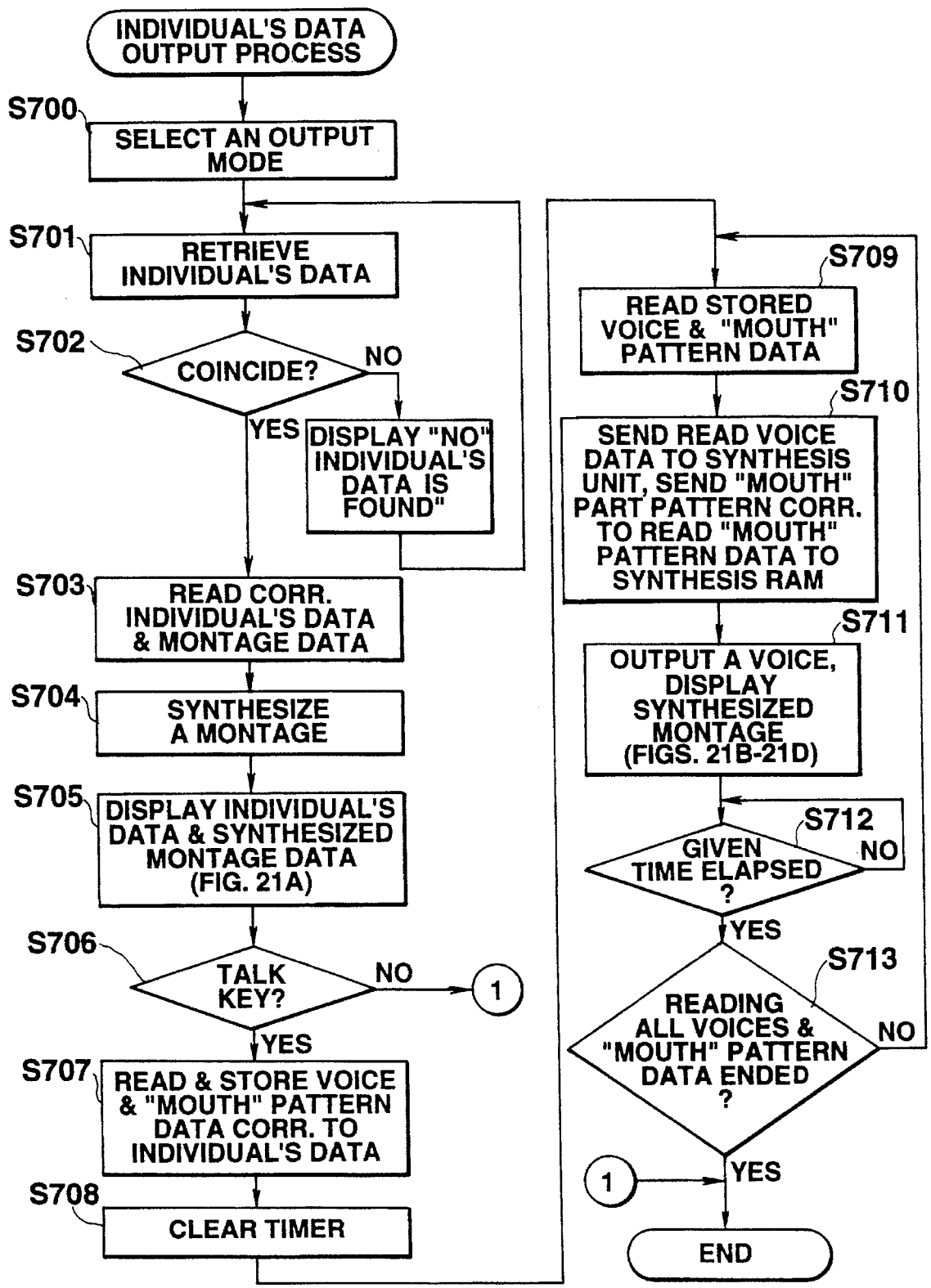
FIG. 20 is a flowchart indicative of an individual's data outputting process.

Various kinds of processes in the object image display device MA of the second embodiment will be described next with reference to the flowcharts of FIGS. 18–20.

First, a procedure for inputting individual's data will be described with respect to the flowchart of FIG. 18.

This procedure involves inputting and recording data on an individual's name, telephone number and his face montage. First, at step S400 the mode setting key 5 is operated to set the device in an individual's data input mode.

Control then passes to step S401, where "Name ?" is displayed on the display 2. Control then passes to step S402, where the name (for example, "Aida Ken") is input by the operation of the key-in unit 1a.

Control then passes to step S403, where the name "Aida Ken" input at the step S402 is changed to Chinese characters "ooo".

Control then passes to step S404, where it is determined whether the OK key 12 is operated for inputting purposes. If not, control returns to step S403, where the appropriate processing is iterated until the name is changed to the desired Chinese characters. If so at step S404, control passes to step S405, where the Chinese character data changed at the step S403 is stored in the RAM 24.

Control then passes to step S406, where "what is the pronunciation of the name "?" is displayed on the display 2. Control then passes to step S407, where data on the pronunciation of the name (in this example, "Aida Ken") is input by the operation of the key-in unit 1.

Control then passes to step S408, where it is determined whether the OK key 12 is operated for inputting purposes. If not, control returns to step S407, where data on the pronunciation of the name is re-input. If so at step S408, control passes to step S409, where the data on the kanas representing the pronunciation of the name input at the step S407 is stored in the RAM 24.

Control then passes to step S410, where "Tel. ?" is displayed on the display 2. Control then passes to step S411, where the telephone number (in this example, 03(300)*) is keyed in by the ten key unit 14. Control then passes to step S412 where it is determined whether the OK key 12 is operated for inputting purposes. If not, control returns to step S411, where the telephone number is again keyed in. If so at step S412, control passes to step S413, where the telephone number (03(300)*) keyed in at step S411 and data on the pronunciation of the telephone number (óu θri: θri: óu óu ... ) are stored in the RAM 24.

Control then passes to step S411, where "A montage is created ?" is displayed on the display 2. Control then passes to step S415, where it is determined whether the montage creation key MS is operated for inputting purposes. If not, control passes to step S417 while if so at step S415, control passes to step S416, where a subroutine of the montage creation process similar to that in FIG. 7 is executed.

Then control passes to step S417, where it is determined whether the record key 13 is operated for inputting purposes.

If not, control returns to step S401, where inputting individual's data on the other person is repeated. If so at step S417, control passes to step S418, where the input individual's data and his montage data are stored in the RAM 24 to thereby terminate this process. By this processing, the name and telephone number of the person, data on the pronunciation of those data items and the montage data are stored. The montage creation process at step S416 involves, for example, creation of a person's face F1 on the basis of a combination of part patterns and display of the face F1, as shown in FIG. 21A.

The "mouth" change setting mode process will be described next with reference to the flowchart of FIG. 19.

This process is executed when the "mouth" change setting mode is set by the operation of the mode setting key 5 to set and record a "mouth" change pattern of a montage.

First, at step S600 one recorded montage (for example, a face F1 montage of FIG. 21A) is selected. Control then passes to step S601, where it is determined whether a moving "mouth" key 7 is operated for inputting purposes. If not, a looping operation is performed until the moving "mouth" key 7 is operated. If so at step S601, control passes to step S602, where a part pattern indicated by the "mouth" part pattern number of the recorded montage F1 selected at step S600 is read from the "mouth" pattern ROM section 30.

Control then passes to step S603, where all the "mouth" patterns are displayed together. Control then passes to step S604, where a desired "mouth" pattern is selected by the operation of the changed part select key 10.

Control then passes to step S605, where the changed "mouth" pattern is displayed on the display 2, and a time duration when a desired voice is output is set. Control then passes to step S606, where the selected "mouth" pattern and the set time duration data are stored at predetermined address in the "mouth" part pattern-time RAM section 33 (FIG. 17).

Control then passes to step S607, where the address number in the "mouth" part pattern-time RAM section 33 is incremented by one. Control then passes to step S608, where it is determined whether the OK key 12 is operated for inputting purposes. If so, the processing is terminated. If not at step S608, control returns to step S603, where selection and storage of another "mouth" pattern continues to be made again.

By this processing, a "mouth" change pattern of a montage and an output time duration which the operator desires are set freely.

The individual's data outputting process will be described with reference to the flowchart of FIG. 20. This process involves displaying and outputting individual's data such as the name and telephone number of a person and outputting the individual's data in voice.

First, at step S700 the individual's data output mode is set by the mode setting key 5. Control then passes to S701, where desired individual's data is retrieved on the basis of the keyed-in data by the key-in unit 1 (for example, "Aida Ken" is keyed in).

Control then passes to step S702, where it is determined whether the data keyed in at step S701 coincides with the individual's data stored in the RAM 24. If not, control passes to step S714, and "no data is found" is displayed on the display 2. Control then returns to step S701, where the individual's data is again retrieved. If so at step S702, control passes to step S703, where the corresponding individual's data and montage data (in this example, the individual data on the "Aida Ken" and part pattern number group GP1) are read from the RAM 24.

Control then passes to step S704, where a part pattern is read from the basic part pattern ROM section 22 in accordance with the part pattern number group GP1 read at step S703 and the montage face F1 of the "Aida Ken" is synthesized from those read part patterns.

Control then passes to step S705, the individual's data on the "Aida Ken" and the face F1 of the synthesized montage are displayed (FIG. 21A).

Control then passes to step S706, where it is determined whether the talk key 4 is operated for inputting purposes. If not, the processing is terminated. If so at step S706, control passes to step S707, where voice data and "mouth" part pattern data for the individual's data are read from the RAM 24. Control then passes to step S708, where the timer 34 of CPU 20 is cleared.

Control then passes to step S709, where the stored voice data and "mouth" part pattern data are read. Control then passes to step S710, where the read voice data is sent to the voice synthesis unit 35, and a "mouth" part pattern corresponding to the read "mouth" part pattern data is read from the "mouth" pattern ROM section 30 and the "mouth" part pattern is sent to the synthesis RAM 27.

Control then passes to step S711, where a voice "a" is generated from the speaker on the basis of the read voice data and the face F2 montage synthesized by the synthesis RAM 27 is displayed on the display 2 (FIG. 21B).

Control then passes to step S712, where it is determined whether a predetermined time (in this example, three seconds, as shown in FIG. 17) has elapsed. If not, control waits until the predetermined time has elapsed. If so at step S712, control passes to step S713, where it is determined whether all the voices and "mouth" part patterns have been read. If so at step S713, processing is terminated. If not, control returns to step S709, where outputting the voice and the synthesized face montage is repeated.

Thus, as shown in FIG. 21B–D, in the second embodiment, the individual's data (name, telephone number, etc.,) of "Aida Ken" and his face (F1–F4) is sequentially changed and displayed with time on the display 2. In addition, pronunciation of his name and telephone number, etc., is output as "Aida Ken" in voice in conjunction with a change of his face F1→F4. Thus, a moving montage is displayed to thereby add to an interest in the device and to greatly improve the practical value of this device and the value of this device as commodities.

According to the second embodiment, since a combination of part patterns of a person's face montage is sequentially changed on the basis of the data on individual's data such as the name of the person and at least part of his face are sequentially changed and his changed face is then displayed or printed out, this device shows a person himself as if he were talking about his name to pronunciation of his name to thereby increase interest further in such displayed person.

Since in the second embodiment a voice is generated in correspondence to a person's sequentially changing face and mouth, he appears to pronounce his name while moving his mouth. Thus, this device adds to an interest not encountered so far.

Third Embodiment

FIGS. 22–32D show a third embodiment of the present invention. The same reference numeral is used to identify the same element of the third and first embodiments and further description of that element will be omitted.

FIG. 22 shows the appearance of the object image display device as the third embodiment. In FIG. 22, a panel 1a is provided thereon with a voice input unit 38 such as a microphone, a speaker 3, a montage mode select switch MS, a power supply ON/OFF switch 5, a mode setting key 5, a voice record key 37, a record key 13, a basic type select key 9, a changed part select key 10, and a pattern change key 11. Provided on a data input panel 1b are a ten key unit 14 and an alphabetic key 15.

Figure 23:
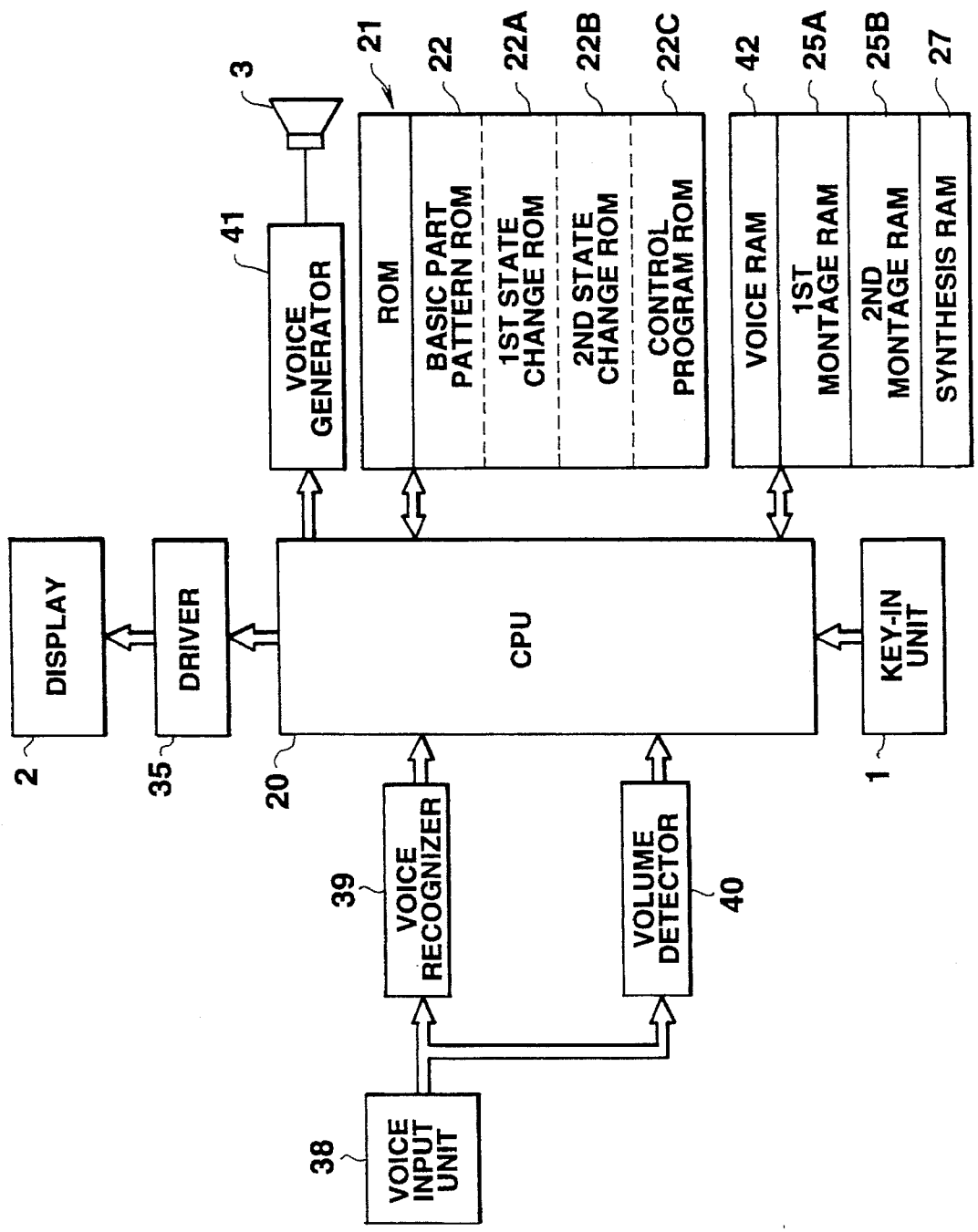
FIG. 23 is a block diagram of an electronic circuit of the image display device as the third embodiment.

The circuit configuration of the object image display device MB as the third embodiment will be described next with reference to FIG. 23.

In the device MB, a CPU 20 is connected to a ROM 21 which is composed of a basic part pattern ROM section 22, a first state change ROM section 22a, a second state change ROM section 22b, and a control program ROM section 22c; a voice RAM section 42; a first montage RAM 25A; a second montage RAM section 25B; a synthesis RAM section 27; a key-in unit 1; a voice input unit 38; a voice recognition unit 39; a volume detector 40; a voice generator 41; a speaker 3; and a display 2.

The voice recognizer 39 performs an analysis operation on the input voice, matches the analyzed voice pattern with a previously set voice standard pattern to recognize the contents of the input voice. The volume detector 40 is composed of a sound sensor which senses the sound pressure applied thereto. The voice generator 41 is composed of a voice synthesis chip which synthesizes a voice on the basis of voice data stored in the voice RAM 42.

The basic part pattern ROM section 22 is similar to the basic part pattern ROM section 22 of FIG. 3 and stores kinds of part patterns classified to "contour", "hair style" "eyes" "nose" "mouth" etc For example, as shown in FIG. 24, an "averaged face" contour part pattern is stored at address No. "01" for the "contour" part pattern; a "round face" part pattern is stored at address No. "02"..., a "horse face" part pattern is stored at address No. "49", ... and a "lion face" contour part pattern is stored at address No. "50".

A "hair style with erect hair" "part pattern" is stored at address No. "01" for the "hair style" part pattern; a "hair style with parted-at-the-side hair" part pattern is stored at address No. "02"; a "horse's hair style" part pattern is stored at address No. "49", and a "lion's hair style" part pattern is stored at address No. "50".

Similarly, a plurality of "eyes" part patterns, a plurality of "nose" part patterns, and a plurality of "mouth" part patterns are stored.

The first and second state change ROMs 22A and 22B store kinds of part patterns prepared for changing the face expressions of the persons, in correspondence to the voice characteristic (for example, the contents of the voice data ("roar !", "laugh !", "get angry !", etc.,) and high or low volume level, etc.) input through the voice input unit 38 and various numbered voice data items corresponding to the face expressions.

Figure 25:
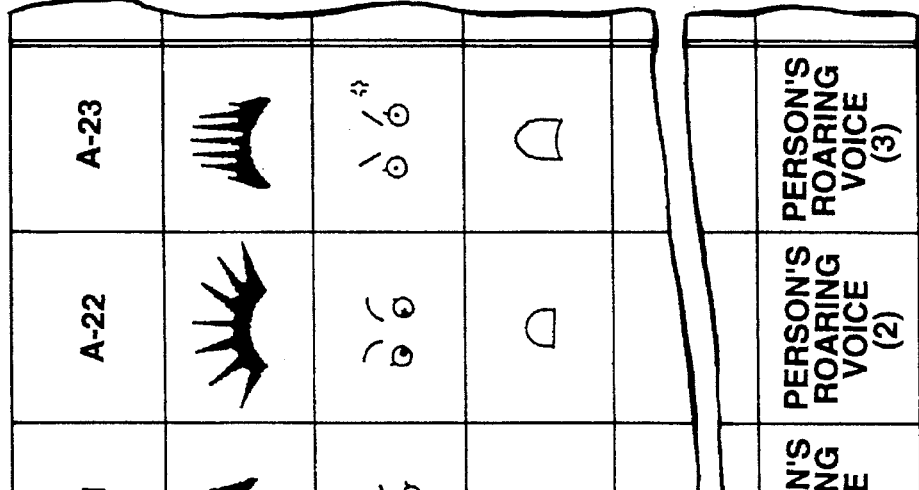
FIG. 25 shows a stored state of part patterns and voice data in a first state change ROM section.

The first state change ROM section 22A stores "roaring face" part patterns in correspondence to the respective part patterns stored in the basic part pattern of ROM section 22. For example, as shown in FIG. 25, it stores various part patterns representing "roaring faces". The first state change ROM section 22A stores three kinds of part patterns having different shapes and corresponding voice data in the areas of Nos. "A-11", "A-12", and "A-13" thereof in correspondence to the respective part patterns ("hair style", "eyes", "mouth" part patterns, etc.) having No. "01" in the basic part pattern ROM section 22. The first state change ROM section 22A also stores three kinds of part patterns having different shapes and corresponding voice data in the areas of Nos. "A-21", "A-22" and "A-23" therein. Similarly, it also part patterns having changed expressions corresponding to the respective part patterns in the basic part pattern ROM section 22 and corresponding voice data for the respective part patterns.

In this case, the part patterns stored in the respective part areas corresponding to the No. "A-11" are "expression" part patterns present when the volume of the voice "roar !" input through the voice input unit 38 is small. In the case of this embodiment, a "hair style" with "a little erect hairs" part pattern, a "somewhat up-turned eyes" part pattern, and a "small roaring mouth" part pattern are stored. In the case of the voice data corresponding to those respective part patterns, a roaring voice "wo" of a small volume signal present when the volume of the voice of "roar !" is small is stored in the form of a digital.

The part patterns stored in the respective part areas corresponding to No. "A-12" are "expression" part patterns present when the volume of the voice of "roar !" input from the voice input unit 38 is an average one. In the present embodiment, a "hair style with considerably erect hairs" part pattern, a "considerably up-turned eyes" part pattern, and a "considerably large roaring mouth" part pattern, etc., are stored. In the case of the voice data items corresponding to those respective part patterns, data on a roaring voice "wo" having a volume present when the volume of the voice "roar !" is somewhat large is stored in the form of a digital signal.

The part patterns stored in the respective areas corresponding to No. "A-13" are "expression" part patterns present when the volume of the voice of "roar" input from the voice input unit 38 is a large one. In the present embodiment, a "hair style with completely erect hair" part pattern, an "greatly up-turned eyes" part pattern, a "large roaring mouth" part pattern are stored. In the case of the voice data items corresponding to those respective part patterns, data on a roaring voice "wo" having a large volume present when the volume of the voice "roar !" is considerably large is stored in the form of a digital signal.

Similarly, for each of other Nos. "A-21", "A-22", "A-23", etc., data on a voice is stored which has a volume corresponding to a part pattern having an expression which corresponds to the magnitude of the volume of the voice "roar !" input from the voice input unit 38.

As shown in FIG. 26, a "laughing face" part pattern and body shape" is stored in correspondence to each of the part patterns stored in the basic part pattern ROM section 22 in the second state change ROM section 22B. The second state change ROM 22B is the same as the first state change ROM 22A except that in this case of the respective part patterns and voice data items stored in the second state change ROM section 22B, "laughing face" part patterns are stored in place of the "roaring face" part patterns stored in the first state change ROM section 22A, and data on utterance given when the montage laughs is stored, and further description of other points will be omitted.

While in the present embodiment storage of part patterns and voice data corresponding to the contents of voices "roar !" and "laugh !" input to the first and second state change ROM sections 22A and 22B, respectively, has been illustrated, the present invention is not limited to that particular case. For example, part patterns corresponding to other voices such as "get angry !", "cry !", etc may be stored.

The control ROM section 22C stores various control programs which CPU 20 uses to control corresponding operations of the object image display device MB.

The voice RAM 42 stores as a digital signal a voice input by the voice input unit 38 and numbered depending on the contents of the voice.

For example, as shown in FIG. 27, the voice "roar !" is stored numbered "1"; the voice "laugh !" is stored numbered "2"; and the voice "cry !" is stored numbered "3".

The first montage RAM section 25A stores part pattern numbers of each of created face montages and voice numbers.

As shown in FIG. 28A, in this embodiment, the first montage RAM 25A stores a voice number "0" indicative of "muteness" and part pattern number group GP1 in the No. "1" area thereof. The part pattern number group GP1 is composed of a "contour" part pattern No. "50"; a "hair style" part pattern No. "50"; an "eyes" part pattern No. "50"; a "nose" part pattern No. "50"; . . . , and a "both legs" part pattern No. "50". The first montage RAM 25A also stores a voice number "1" indicative of the voice contents "roar !" and part pattern number group GP2 in the No. "2" storage area thereof. The part pattern number group GP2 is composed of a "contour" part pattern No. "50"; a "hair style" part pattern No. "50"; an "eyes" part pattern No. "32"; a "nose" part pattern No. "50"; . . . , and a "both legs" part pattern No. "02". Similarly, the RAM 25A also stores voice numbers and corresponding part pattern number groups GP3–GP20 in other storage areas "3"–"20", respectively.

The second montage RAM 25B stores not data on the created montages but part pattern number groups of faces changed depending on the input contents of voices and corresponding voice numbers.

As shown in FIG. 28B, in the embodiment, the second montage RAM 25B stores a voice number "0" indicative of "muteness" and part pattern number group HP1 in the No. "1" storage area thereof. The part pattern number group HP1 is composed of a "contour" part pattern No. "50"; a "hair style" part pattern No. "50"; an "eyes" part pattern No. "50"; a "nose" part pattern No. "50"; ..., and a "both legs" part pattern No. "50". Since the montage face does not change when the input voice is "mute", the part pattern number groups GP1 and HP1 stored in Nos. "1" areas of FIGS. 28A and 28B are the same. Those locations in the part pattern groups designated by "–" show that no part pattern numbers are recorded therein.

Figure 29:
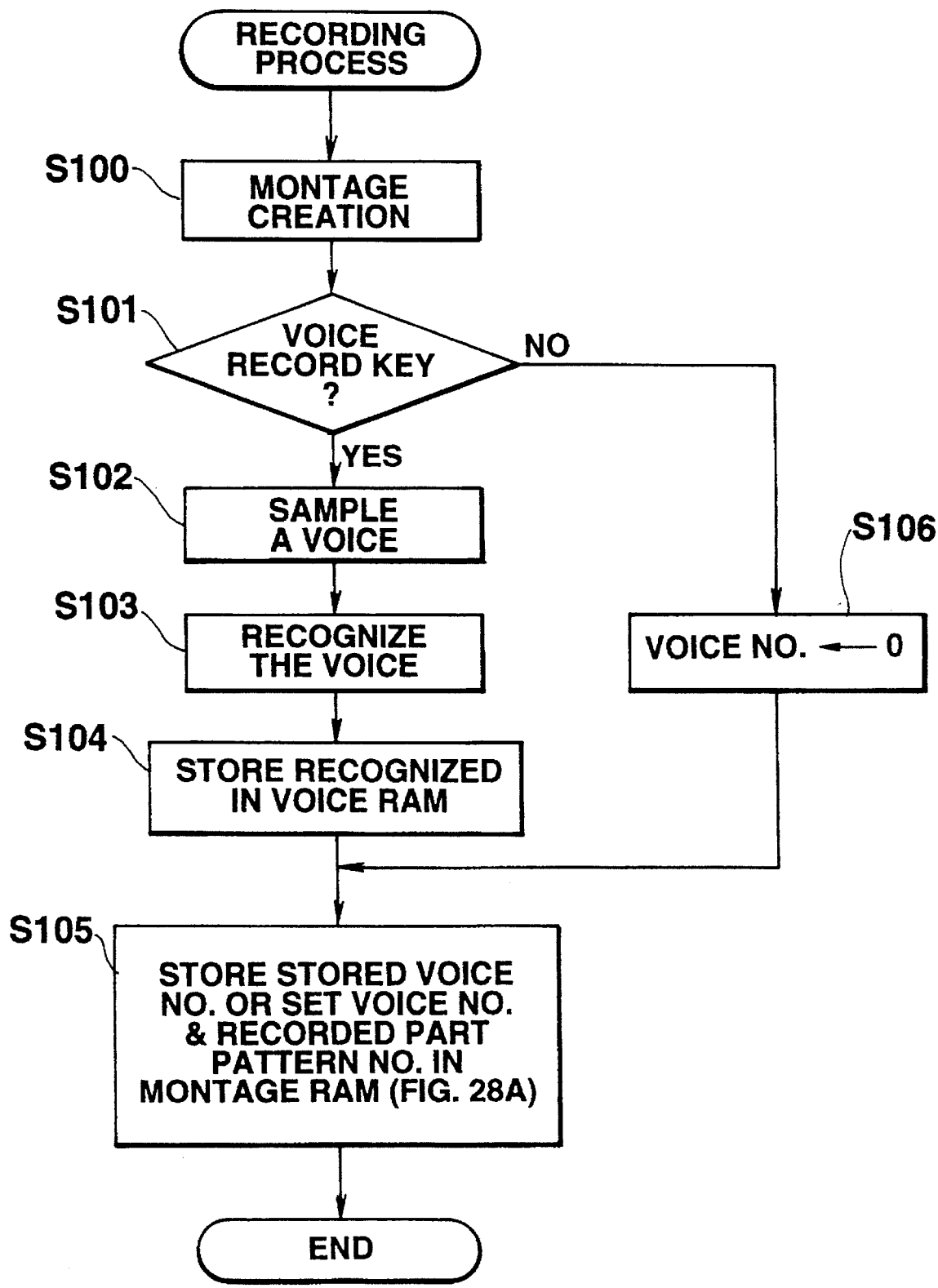
FIG. 29 is a flowchart indicative of a recording process.
Figure 30:
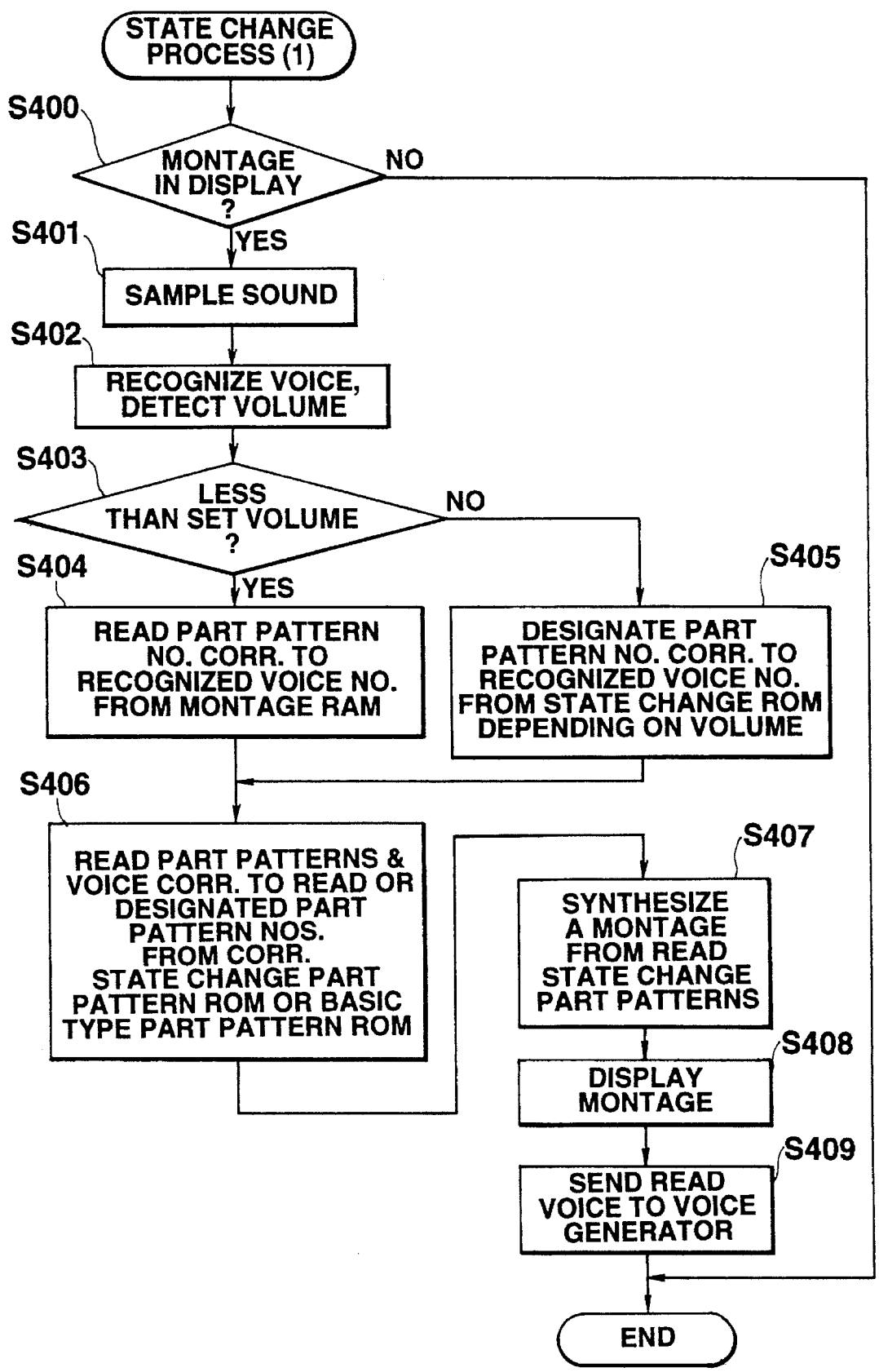
FIG. 30 is a flowchart indicative of a state changing process.
Figure 31:
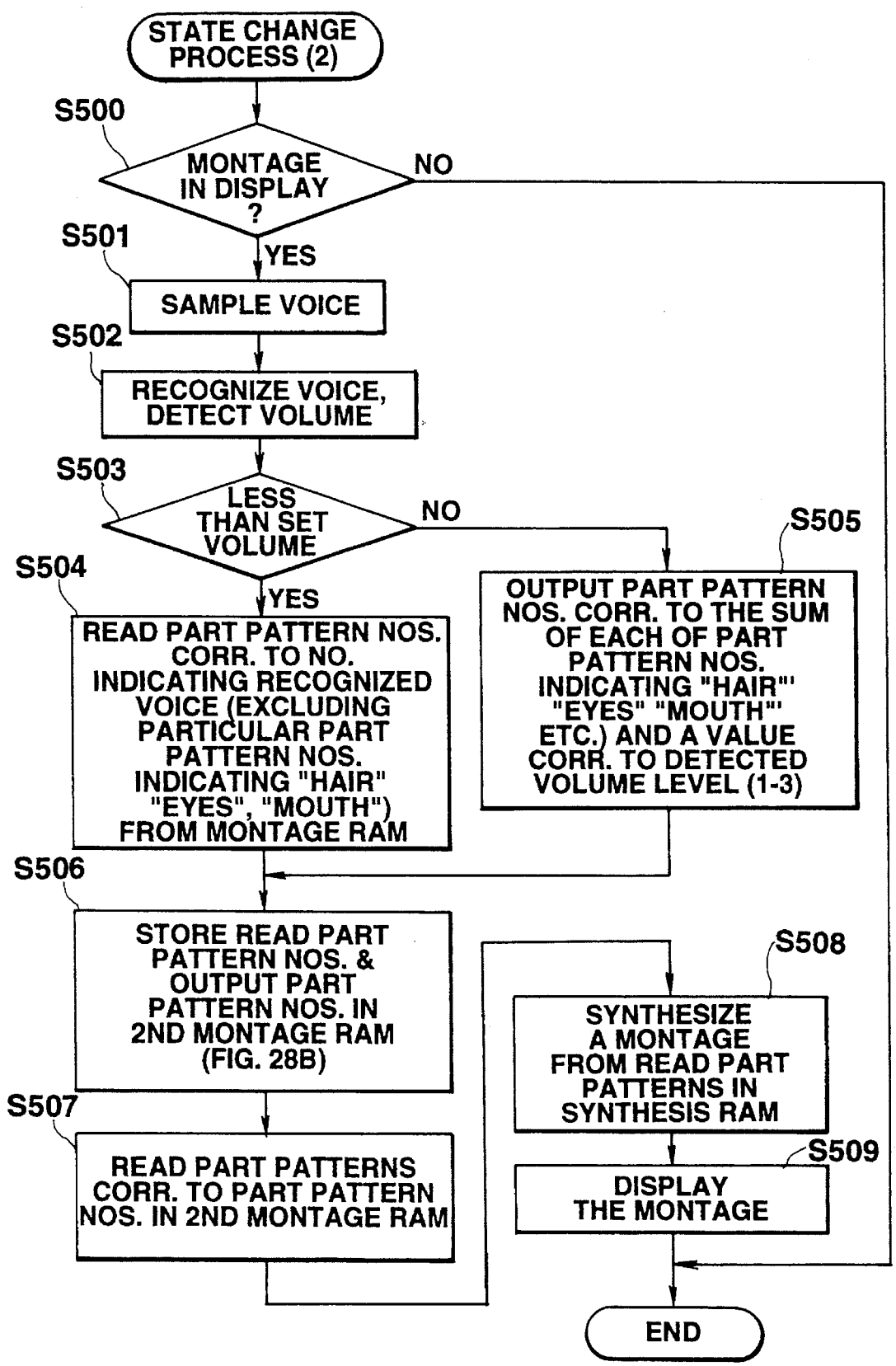
FIG. 31 is a flowchart indicative of another state changing process.

Various processes executed by the object image display device MB as the present embodiment will be described next with respect to the flowcharts of FIGS. 29–31.

First, a recording process of FIG. 29 will be described which involves recording part pattern number groups of a created montage and corresponding voice numbers.

Figure 7:
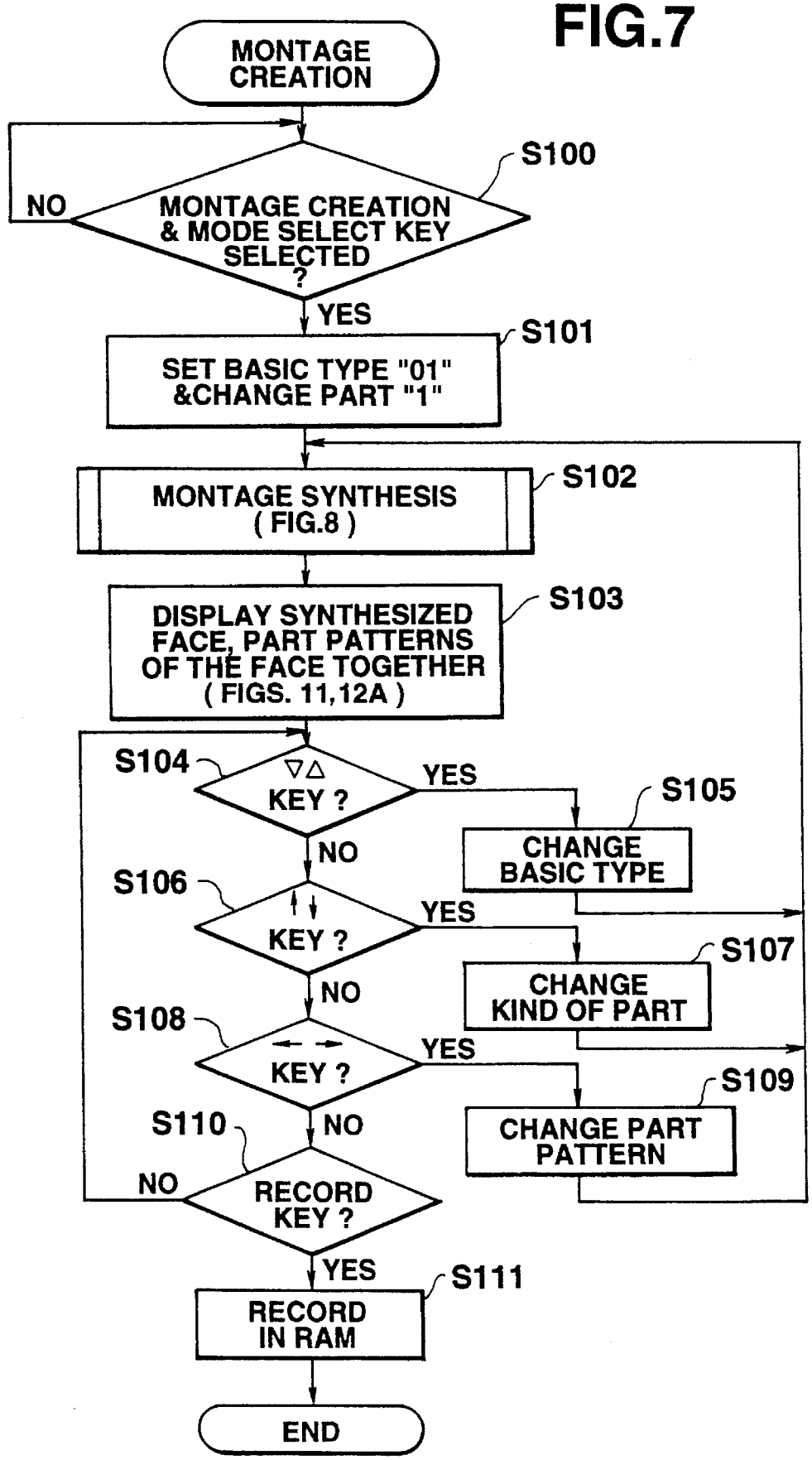
FIG. 7 is a flowchart indicative of a montage creating process.

First, at step S100 a subroutine of a montage creation process of FIG. 7 is executed. By this process, the part pattern number groups GP1–GP20 each composing the montage data are stored in any ones of predetermined areas of the montage RAM section 25A.

Control then passes to step S101, where it is determined whether the voice record key 37 is operated. If so, control passes to step S102, where the voice input from the voice input unit 38 is sampled. Control then passes to step S103, where the sampled voice (for example, "roar !") is recognized by the voice recognizer 39.

Control then passes to step S104, where the recognized voice is stored in a predetermined storage area of the voice RAM 42. Control then passes to step S105, where a voice number (for example, No. "1" if the recognized voice is "roar !") indicative of the recognized voice and the designated part pattern number group GP2 of a montage are stored, for example, in a storage area "2" of the first montage RAM section 25A and the series of processes is terminated (FIG. 28A).

If not at step S101, control passes to step S106, where "0" is set in the voice number to designate muteness. Control then passes to step S105, where the voice number "0" and the part pattern number group GP1 are stored in a stored area No. "1" of the first montage RAM 25A and the processing is then terminated.

This process includes recording (1) pairs of part pattern number groups for the created montages and input voices or and (2) pairs of part pattern number groups for created montages and voices designated by the voice record key 37.

One example of state change processes which involve changing the displayed state of a recorded montage on the basis of an input voice will be described next on the basis of the flowchart of FIG. 30.

First, at step S400 it is determined whether a montage is now being displayed or a montage display mode is set. If not, the processing is terminated. If so at step S400, control passes to step S401, where a voice (for example, "roar !") from the voice input unit 38 is sampled. Control then passes to step S402, where the voice recognizer 39 recognizes the contents of the sampled voices and the volume detector 40 detects the level of the volume of the voice.

Control then passes to step S403, where it is determined whether the detected volume is less than a predetermined volume level. If so, control passes to step S404, where a part pattern number group GP1 corresponding to a voice number (in this example, "0" indicative of muteness because the detected volume is less than the set volume level) indicative of the recognized voice "roar !" is read from the storage area No. "1" of the first montage RAM 25A.

Control then passes to step S406, where the respective part patterns indicated by the part pattern number group GP1 read at step S405 are read from the basic part pattern ROM section 22. At this time, in the case of muteness, no voice data is read because no voice data is stored in the ROM section 22.

Control then passes to step S407, where a montage F1 is synthesized by the synthesis RAM 27 from the respective part patterns read at step S406. Control then passes to step S408, where the montage F1 is displayed on the display 2 (FIG. 32A).

Control then passes to step S409, where the read voice data is sent to the voice generator 4 to generate a corresponding voice from the speaker. In this case, since the voice number designated at step S404 is "0" (mute), the voice generator 4 generates no voice and the series of processes is terminated.

If the detected volume of the input voice (for example, "roar !") is determined to be larger than the predetermined volume value at step S403, control passes to step S405, where one of the three state change part pattern number groups is selected and designated from the first state change ROM section 22A in correspondence to the recognized voice.

If the detected volume is somewhat larger than the predetermined value, the part pattern number group No. "A-51" is designated from the first state change ROM section 22A. If the detected volume is considerably larger than the predetermined value, the part pattern number group No. "A-52" is designated. If the detected volume is very larger than the predetermined value, the part pattern number group No. "A-53" is designated.

There are various methods of designating the respective part pattern number groups. In the method used in this embodiment, if the detected volume of the voice is somewhat larger than the predetermined value, "1" is added to a part pattern number (in the present embodiment, any part pattern number is "50") indicative of each of the parts of a target montage so as to be No. "A-51"; if the detected volume of the voice is considerably larger than the predetermined value, "2" is added to "50" so as to be No. "A-52"; and if the detected volume is very larger than the predetermined value, "3" is added to "50" so to be No. "A-53".

Control then passes to step S406, where a part pattern (for example, a part pattern corresponding to No. "A-53" which implies a very higher volume level) corresponding to the part pattern number group designated at step S405 is read from the first state change ROM 22A. Control then passes to step S407, where a montage F2 is synthesized by the synthesis RAM 27 from the respective read state change part patterns. Control then passes to step S408, where the changed montage F2 is displayed on the display 2 (FIG. 32B).

Control then passes to step S409, where voice data (for example, a lion's large roaring voice (3)) read in correspondence to the No. "A-53" in the first state change ROM section 22A is generated from the voice generator 4 to thereby terminate the series of processes.

By these processes, the displayed recorded montage is changed depending the recognized contents and characteristic of the voice, and a voice corresponding to the changed displayed state of the montage is generated to thereby add to an interest in the montage image.

Another embodiment of the state change process will be described next with reference to the flowchart of FIG. 31. First, at step S500 it is determined whether a montage is now in display or a montage display mode is now set. If not, the process is terminated. If so at step S500, control passes to step S501, where the voice input unit 38 samples a voice, for example, of "laugh !"). Control then passes to step S502, the sampled contents of the voice is recognized by the voice recognizer 39 and the sampled volume of the voice is detected by the volume detector 40.

Control then passes to step S503, where it is determined whether the detected volume of the voice is less than the set volume level. If so, control passes to step S504, where all the part patter numbers other than specified part patterns such as "hair style", "eyes", "mouth", etc., are read from part pattern number Group GP1 corresponding to a voice number (in this case, No. "0" (muteness) is set because the volume is excessively small) which corresponds to the recognized voice (for example, the voice "laugh !").

Control then passes to step S506, where a part pattern number group HP1 composed of the read other part pattern numbers and the displayed part pattern number is stored, for example, in a storage area No. "1" in the second montage RAM section 25B.

Control then passes to step S507, where the respective part patterns corresponding to the part pattern number group HP1 in the second montage RAM section 25B are read from the basic part pattern ROM section 22.

Control then passes to step S508, where a montage is synthesized by the synthesis RAM 27 from the respective part patterns read at step S507. Control then passes to step S509, where the synthesized montage is displayed on the display 2 and the processing operation is terminated.

If it is determined at step S503 that the detected volume has exceeded the set volume value, control passes to step S505, where one of the part pattern number groups for the state change corresponding to the recognized voice (for example, the voice "laugh !") is selected from the second state change ROM section 22B depending on the detected volume value (in this case, the respective selected part patterns are limited to specified part patterns such as "hair style", "eyes", "mouth", the state changes of which are desired.).

In this case, if the detected volume is somewhat larger than the predetermined value, the part pattern number group No. "B-51" is designated from the second state change ROM section 22B; if the detected volume is considerably larger than the predetermined value, the part pattern number group No. "B-52" is designated; and if the detected volume value is very higher than the predetermined level, the part pattern number group No. "B-53" is designated.

Control then passes to step S506, where a number (for example, "B-53") corresponding to the part pattern number group HP20 designated at the step S505 is stored in the second montage RAM section 25B storage area.

Control then passes to step S507, where part patterns corresponding to the respective part pattern numbers (No. "B-53") in the second montage RAM section 25B are read from the second state change ROM section 22B.

Control then passes to step S508, where a montage F4 is synthesized by the synthesis RAM 27 from the part patterns read at step S507. Control then passes to step S509, where the synthesized montage F4 is displayed on the display 2 (FIG. 32D) to thereby terminate the processing operations.

By this process, the montage is changed depending on voice. In the case of this second state change process (FIG. 31), only a part pattern number group corresponding to a specified part pattern the displayed state of which is desired to be changed rather than the first state change process (FIG. 30) where the part pattern number group corresponding to all the part patterns of the face is stored in the second montage RAM section 25A. Thus, the storage capacity for the data is small advantageously.

As described above, according to the third embodiment, not only the recorded contents and shape of the montage are changed depending on the contents and characteristic (for example, volume, tone, pitch) of the user' utterance, but also the montage's utterance is changed depending on changes in the contents and shape of the montage to thereby to add to an interest in the montage image.

While in the third embodiment a change in the montage face depending on the level of the voice volume as its characteristic has been described, the present invention is not limited to the particular case. The face may be changed depending on the pitch and/or tone of a voice.

FIG. 33 is a block diagram of an electronic circuit of an object image display device as a fourth embodiment of the present invention. The same reference numeral is used to identify the same element in the fourth and first embodiments and further description of that element will be omitted.

This device is provided with a CPU 20, which controls the respective operations of the circuit elements thereof in accordance with an object image display program stored in a ROM 53 on the basis of a recognition language in a voice recognizer 39 with CPU 20 being connected to the voice recognizer 39, a ROM 53, a part ROM 21, a RAM 24, a synthesis RAM 27 and a display 35.

Figure 2:
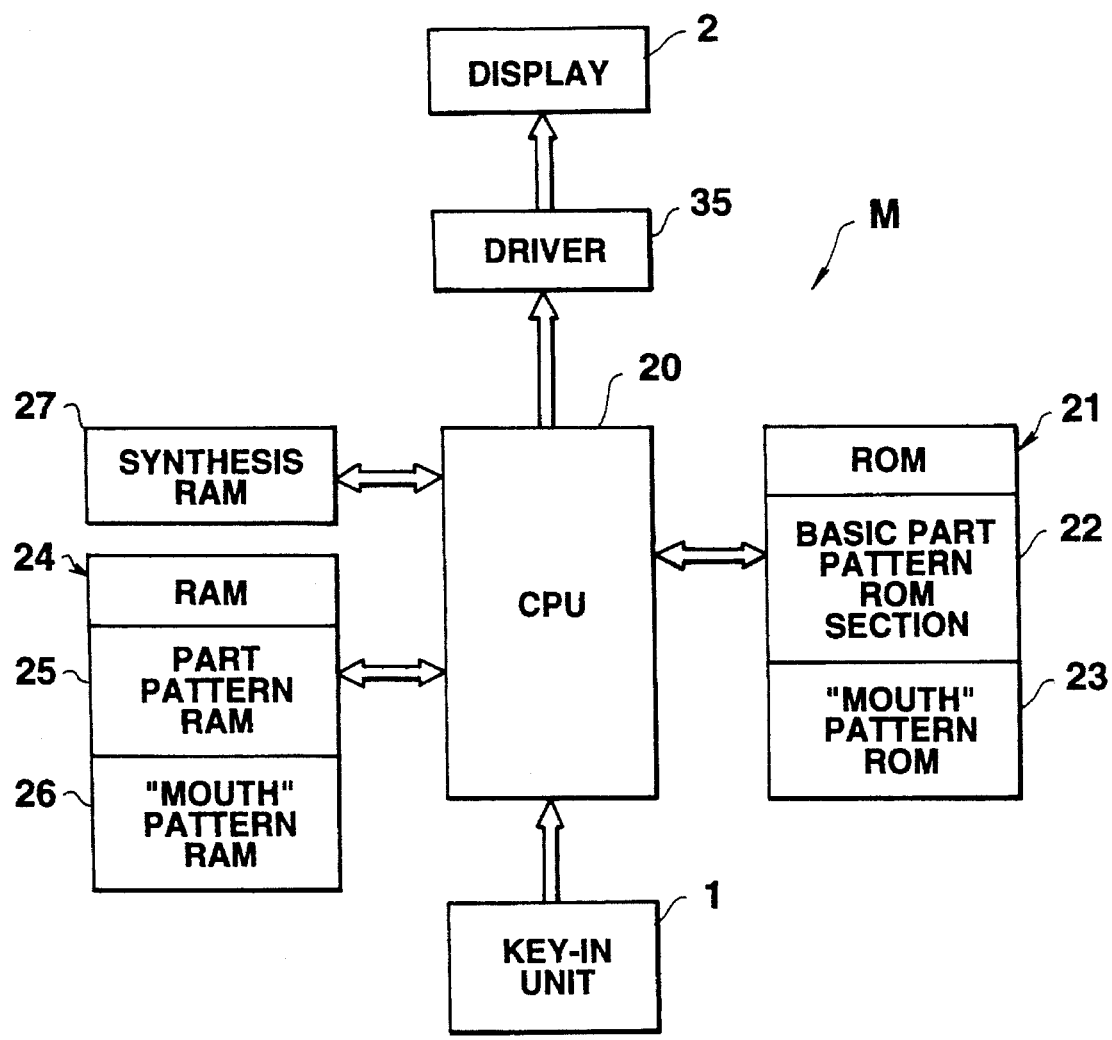
FIG. 2 is a block diagram of an electronic circuit of the image display device.

The part ROM 21 is similar to the basic part pattern ROM section 22 of FIG. 2. In this embodiment, part pages 21A, 21B, ..., 21N are provided for the respective parts "eyes", "brows", "nose", etc., of a face and each store a plurality of kinds of part patterns in the form of bit map data. In this case, the kinds of part patterns in the respective part pages 21A, 21B, ... 21N are managed by a row pointer while the magnitudes of part patterns are managed by a column pointer.

Figures 34, 35:
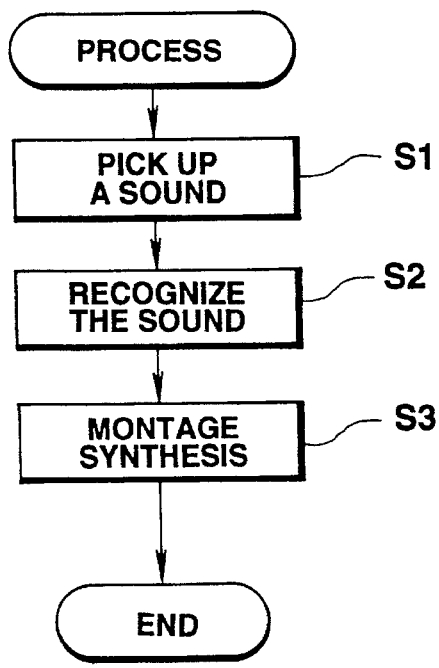
FIG. 34 shows a stored state of part patterns on an "eyes" part page in the part ROM section.
FIG. 35 is a flowchart indicative of a basic montage creating process.

FIG. 34 shows a stored state of part patterns on an "eyes" part page 21A of the part ROM 21. The kinds of the part patterns on each of the parts in the part ROM 21 differ in vertical or column direction while the sizes differ in five steps in horizontal or row direction. In the present embodiment, the standard size of the part pattern is stored in a size number area "3".

The respective part pages 21A, 21B, ..., 21N of the part ROM 21 are designated by a page pointer 58 of CPU 20. A row (kind) on a part page designated by the page pointer 58 is designated by a row pointer 59 of CPU 20, and a column (size) is designated by a column pointer 60. A variable of the row (magnitude) is designated by an A register 61.

The RAM 24 is provided with pattern number registers 24A, 24B, ... for the respective parts which stores the corresponding pattern numbers of the parts selected by the user when a montage is created. For example, when "1–3" is written in an "eyes" pattern number register 24a, an "eyes" pattern in row 1, column 3 on an "eyes" part page 21A in the part ROM 21 is selected.

The synthesis RAM 27 synthesizes a montage image from the part patterns read from the respective part pages 21A, 21B, ..., 21N in the part ROM 21 in correspondence to the part pattern numbers stored in the respective part pattern number registers 24a, 24b, ..., in the RAM 24. The synthesized montage image is displayed on the display 35.

The object image display device is provided with an voice input unit 38 to which a voice uttered from the user's utterance enters and a voice recognizer 39, connected to the voice input unit 38. The voice recognizer 39 is provided with a language ROM 54 and retrieves and recognizes a language in the language ROM 54 corresponding to a voice signal input from the voice input unit 38. In the present embodiment, languages stored beforehand in the language ROM 54 as languages which are recognizable in voice are "eyes", "brows", "nose", ... "mouth" as part select languages to select the respective part pages 21A, 21B, ..., 21N in the part ROM 21; "next" which is a part pattern select language to select the kind of part patterns on the selected part page; and "more", "a little", "large", and "small" which are size designating languages to designate the respective sizes of the selected part patterns.

The respective point values of the page pointer 58, row pointer 59 and column pointer 60 of CPU 20, and a recorded value of the A register 61 are controlled in accordance with a recognition language by the voice recognizer 39 and the respective patterns of the parts of a montage are selected.

The operation of the object image display device will be described next. FIG. 35 is a flowchart indicative of a basic process for creating a montage performed by the object image display device.

First, when a part select language, a part pattern select language and a size designating language uttered by the user are input by the voice input unit 38; and sampled by the voice input unit 38 at step S1, and the utterance (voice) is recognized by the voice recognizer 39 (step S2), the respective point values in the page pointer 58, row pointer 59 and column pointer 60, and the recorded value in the A register 61 of CPU 20 are sequentially set in accordance with the respective recognized languages. This causes corresponding part patterns to be read from the part ROM 21 in accordance with the respective set values. A montage is synthesized in the synthesis RAM 27 from the respective read part patterns (step S3).

As a result, repetition of the voice sampling →voice recognitions montage synthesis corresponding to the steps S1–S3 leads to display of a montage as a combination of desired part patterns on the display 35.

Figure 36:
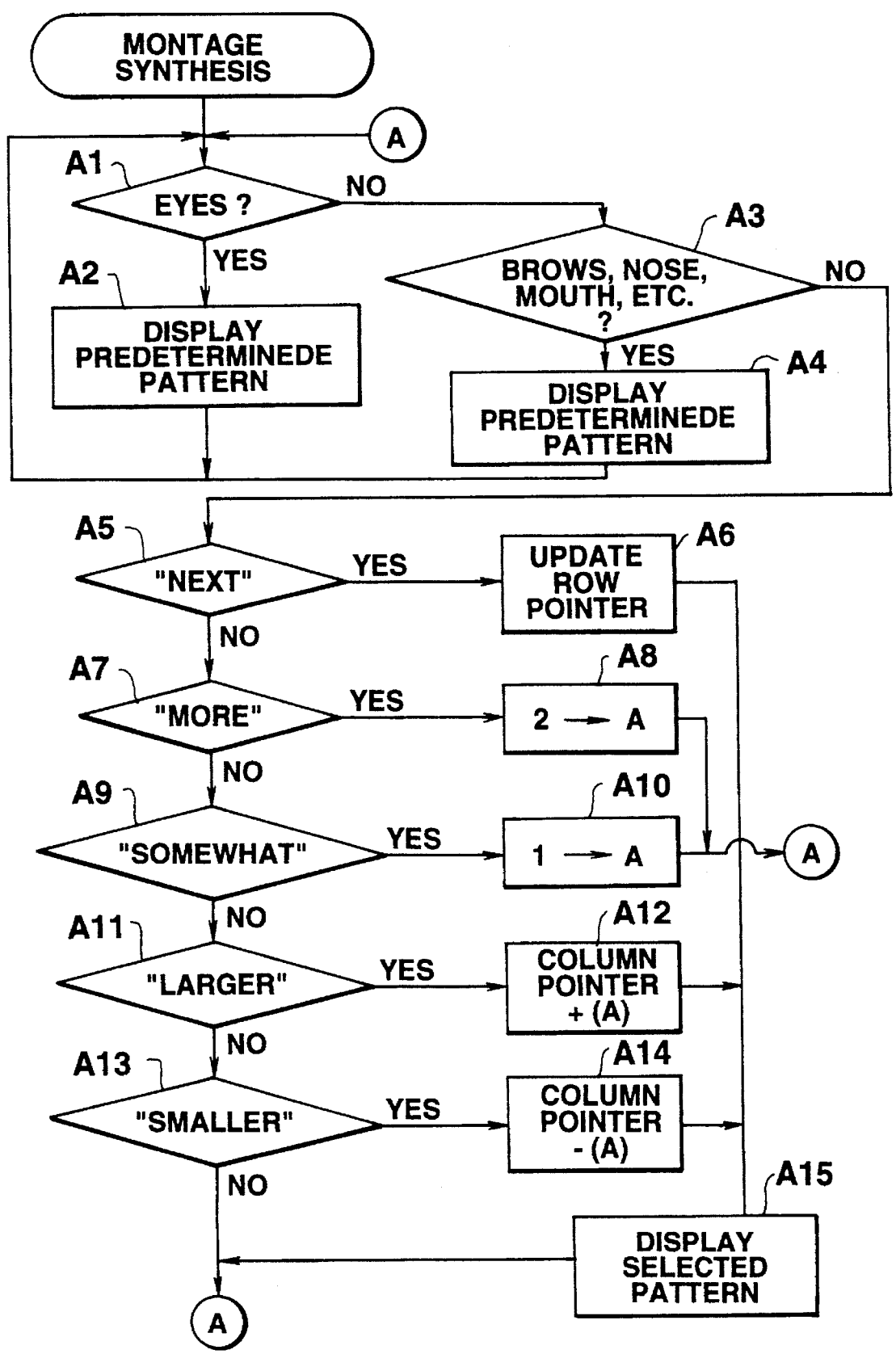
FIG. 36 is a flowchart indicative of a montage synthesis process involved in voice recognition.

FIG. 36 is a flowchart indicative of a montage synthesis involved in the voice recognition in the object image display device. First, the user utters "eyes" against the voice input unit 38. Thus, when the "eyes" as a language recognized by the recognizer 39 is given to CPU 20 (step A1), the page pointer 58, row pointer 59 and column pointer 60 are initialized to "1", "1" and "3", respectively. Thus, an "eyes" part pattern (FIG. 34) in row 1, column 3 on a first "eyes" part page 21A in the part ROM section 21 is read, written into the synthesis RAM 27 and displayed on the display 35 (step A2).

In order to change the "eyes" part pattern in row 1, column 3 on a first part page 21A in the part ROM section 21 selected and displayed initially to a different kind of part pattern, and when a "next" which is a part pattern select language is voice recognized on the basis of the user's utterance (step A6), the row pointer 59 of CPU 20 is updated with "2" (step A15), a part pattern in row 2, column 3 (FIG. 34) on the first "eyes" part page 21A is read and displayed newly on the display 35 (step A1→A3→A5, A6, A15).

In order to change to a larger one the new displayed replacing "eyes" part pattern in row 2, column 3 on the first "eyes" part page 21A and when "more" or "larger" which is a size designating language is voice recognized on the basis of the user's utterance (step A7, A11), "2" is set in the A register 61 of CPU 20 (steps A8, A12), the column pointer 60 is incremented in value (3+2=5) in correspondence to the size variable "2" set in the A register 61, a "larger eyes" part pattern in row 2, column 5 (FIG. 34) on the first "eyes" part page 21A is read and displayed newly on the display 35 (steps A1→A3→A5→A7, A8, A1→A3→A5→A7→A9→A11, A12, A15).

In order to change to a smaller one the displayed replacing "eyes" part pattern in row 2, column 3 on the first "eyes" part page 21A, and when a "somewhat" or "smaller" which is a size designating language is voice recognized on the basis of the user's utterance (steps A9, A13), "1" is set in the A register 61 of CPU 20 (steps A10, A 14), the count of the column pointer 60 is decremented in value (3–2=1) in correspondence to the size variable "1" set in the A register 61, and a "somewhat smaller" "eyes" part pattern in row 2, column 2 (FIG. 34) on the first "eyes" part page 21A is read and displayed newly on the display 35 (steps A1→A3→A5→A7→A9, A10, A1→A3→A5→A7→A9→A11→A13, A14, A15).

In this way, first, when the user utters "brows" against the voice input unit 38 to thereby give to CPU 20 the "brows" as a language recognized by the recognizer 39 (step A3) to select and display the next part in a state where the desired "eyes" part pattern is already selected and displayed, the page pointer 58, row pointer 59 and column pointer 60 are initially set at "2", "1", and "3", respectively, a "brows" part pattern in row 1, column 3 on a second "brows" part page 21A in the part ROM section 21 is read, written into the synthesis RAM 27 and displayed on the display 35 (step A1→A3, A4).

In this case, a number (for example, "2—2") indicative of the "eyes" part pattern set already in the row and column pointers 59 and 60 is written and recorded in the "eyes" part pattern number register 24a in the RAM 24.

Thereafter, similarly, when the part pattern select language "next" is voice recognized, the row pointer 59 is updated with "2", a "brows" part pattern in row 2, column 3 on a second "brows" part page 21B is read and displayed newly on the display 35 (A1→A3→A5, A6, A15).

Similarly, a size designating language including a combination of "more" or "somewhat" and "larger" or "smaller" is voice recognized such that a variable in the size in the A register 61 is set at "2" or "1" and the point value "3" of the column pointer 60 is incremented or decremented depending on the size variable set in the A register 61, and the "brows" part pattern corresponding to the column pointer (2) is changed to a desired size and displayed (A1→A3→A5, A7–A15).

Thereafter, by the voice input operation of part select languages for "nose" to "mouth", similar to that mentioned above, the respective parts of a face are selected and designated. By a voice input operation of a part pattern select language and a size designating language each time a part is selected, the patterns and sizes of the respective selected parts are selectively designated to thereby synthesize and display a desired montage.

Thus, according to the fourth embodiment, for example, "eyes", "nose", "mouth", etc., which are select languages for the respective parts of a face, part pattern select languages such as "next", and size designating languages such as "more", "somewhat", "larger", and "smaller" are stored beforehand in the language ROM 54. These languages are input in voice through the voice input unit 38 and recognized by the voice recognizer 39. Thus, if the recognized languages are the part select languages, predetermined part patterns for "eyes", "nose", "mouth", etc., in the part pages 21A, 21B, . . . , 21N stored beforehand in the part ROM 21 are selected. Subsequently, if the part pattern select languages are recognized, other kinds of part patterns are selected on the same part page. If the size designating language is recognized, a part pattern is selected which is the same in kind and larger or smaller than the predetermined part pattern as a standard size. Those selected part patterns are sequentially combined in the synthesis RAM 27 and displayed on the display 35. Thus, no conventional complicated key-in operations are required and any body is able to create a montage easily and simply.

What is claimed is:

1. An object image display device comprising:

part image storage means for storing a plurality of groups of part images having different shapes, each of the groups corresponding to a respective one of a plurality of predetermined different parts which compose an object, a respective one of the part images of each of the groups being disposable at a position corresponding to one of the plurality of predetermined different parts of the object, said part image storage means also storing designating data for designating the respective part images;

object image storage means for selecting a plurality of part images from among the part images having different shapes of a corresponding one of the groups stored in said part image storage means, and for storing an object image of the object as a combination of the selected plurality of part images;

object image display means for displaying the object image stored in said object image storage means;

part image display means for reading from said part image storage means at least one group of different part images corresponding to at least one part of the object image displayed by said object image means, and for displaying the at least one read group of different part images;

select means for sequentially selecting part images to be successively changed and displayed from among the at least one group of different part images displayed by said part image display means;

designating data storage means for reading sequentially from said part image storage means designating data corresponding to the respective part images selected by said select means, and for storing the read designating data in order;

change start commanding means for initiating a start of successive changes of the respective part images selected by said select means; and display control means responsive to said change start commanding means for sequentially reading out the designating data stored in order in said designating data storage means, for sequentially reading out from said part image storage means part images corresponding to the respective read designating data, and for sequentially substituting the read part images for the corresponding one of the object image displayed on said object image display means, to thereby display the resulting object image as if at least one of the part images of the resulting object image is moved successively.

2. An object image display device comprising:

character data input means for inputting a plurality of character data sequentially;

character data storage means for storing the plurality of character data in order of input;

part image storage means for storing a plurality of groups of part images having different shapes, each of the groups corresponding to a respective one of a plurality of predetermined different parts which compose an object, a respective one of the part images of each of the groups being disposable at a position corresponding to one of the plurality of predetermined different parts of the object, said part image storage means also storing character data corresponding to the respective part images;

object image storage means for storing an object image of the object, the object image including a combination of part images selected from among from the part images having different shapes of a corresponding one of the groups stored in said part image storage means;

object image display means for displaying the object image stored in said object image storage means;

change start commanding means for initiating a start of successive changes of the part images of the object;

read means responsive to said change start commanding means for sequentially reading the character data stored in said character data storage means in order of storage therein; and change means for successively reading out from said part image storage means respective part images corresponding to the character data read sequentially by said read means, and for successively substituting the read out part images for corresponding part images of the object image displayed on said object image display means, to thereby display the resulting object image as if at least one of the part images of the resulting object image is moved successively.

3. An object image display device according to claim 2, further comprising:

voice data storage means for storing a plurality of voice data corresponding to the plurality of character data stored in said character data storage means; and voice outputting means for sequentially reading out from said voice data storage means voice data corresponding to the character data sequentially read by said read means, and for outputting a corresponding voice signal.

4. An object display device comprising:

voice corresponding part image storage means for storing a plurality of groups of part images having different shapes, each of the groups corresponding to a respective one of a plurality of predetermined different parts which compose an object, a respective one of the part images of each of the groups being disposable at a position corresponding to one of the plurality of predetermined different parts of the object, said part image storage means also storing a plurality of voice data each corresponding to a respective one of the part images of the object;

object image storage means for selecting a plurality of part images from among the part images having different shapes of a corresponding one of the groups stored in said part image storage means, and for storing an object image as a combination of the selected plurality of part images;

object image display means for displaying the object image stored in said object image storage means;

voice recognizing means for recognizing a voice input; and change means for reading from said voice corresponding part image storage means a part image corresponding to the voice input recognized by said voice recognizing means, and for substituting the read part image for the corresponding one of the part images of the object image displayed on said object image display means, to thereby display the resulting object image as if at least one of the part images of the object image is moved successively.

5. An object image display device according to claim 4, wherein:

said voice recognizing means comprises voice characteristic detecting means for detecting a characteristic of a voice input; and said change means comprises display change means for changing a part image of at least one part of the object image displayed on said object image display means to a different part image on the basis of the detected characteristic of the voice input detected by said voice character detecting means and the voice input recognized by said voice recognizing means, so as to display the object image such that the at least part of the object image moves.

6. An object image display device according to claim 5, wherein:

a characteristic of the voice detected by said voice characteristic detecting means comprises at least one of a volume, pitch and tone of the voice.

7. An object image display device according to claim 4, wherein:

said change means comprises voice recognizing means for recognizing a voice input corresponding to a designated part of the object; and display change means for changing a part image of at least the designated part of the object to a different part image in accordance with the voice input recognized by said voice recognizing means of said change means so as to display the object image such that the part image of at least the designated part of the object moves.

* * * * *